United States Patent
Tokunaga et al.

(10) Patent No.: US 12,322,409 B2
(45) Date of Patent: Jun. 3, 2025

(54) DATA PROCESSING APPARATUS, DATA PROCESSING METHOD, AND DATA PROCESSING PROGRAM

(71) Applicant: Sony Group Corporation, Tokyo (JP)

(72) Inventors: Ryuji Tokunaga, Tokyo (JP); Shiro Suzuki, Kanagawa (JP); Chisato Kemmochi, Kanagawa (JP); Yuuki Matsumura, Saitama (JP); Takafumi Hattori, Kanagawa (JP); Jun Matsumoto, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 485 days.

(21) Appl. No.: 17/774,801

(22) PCT Filed: Nov. 11, 2020

(86) PCT No.: PCT/JP2020/042022
§ 371 (c)(1),
(2) Date: May 5, 2022

(87) PCT Pub. No.: WO2021/095754
PCT Pub. Date: May 20, 2021

(65) Prior Publication Data
US 2022/0407825 A1 Dec. 22, 2022

(30) Foreign Application Priority Data
Nov. 12, 2019 (JP) .................................. 2019-204525

(51) Int. Cl.
*G10L 21/045* (2013.01)
*G10L 19/005* (2013.01)
(Continued)

(52) U.S. Cl.
CPC ........ *G10L 21/045* (2013.01); *H04L 49/9057* (2013.01); *G10L 19/005* (2013.01); *H04W 4/80* (2018.02)

(58) Field of Classification Search
None
See application file for complete search history.

(56) References Cited

U.S. PATENT DOCUMENTS

| 4,890,237 A | 12/1989 | Bales |
| 2005/0207437 A1 | 9/2005 | Spitzer |

(Continued)

FOREIGN PATENT DOCUMENTS

| AU | 2003252347 A1 | 3/2004 |
| CN | 101610329 A | 12/2009 |

(Continued)

OTHER PUBLICATIONS

Zhang Zhidong et al., "Design and Implementation of Voice Communication System Based on Wireless Sensor Network", Application of Electronic Technique, No. 11, Nov. 6, 2007.

(Continued)

*Primary Examiner* — Diane L Lo
(74) *Attorney, Agent, or Firm* — Wolf, Greenfield & Sacks, P.C.

(57) ABSTRACT

A data processing apparatus (1) includes a signal processing unit (31, 32) and an insertion/deletion unit (33). The signal processing unit performs predetermined signal processing on the wirelessly received data for each frame that includes a predetermined number of samples, and stores the data in the buffers (41, 42). In the case where an amount of the data accumulated in the buffer is out of a predetermined range, the insertion/deletion unit (33) performs insertion/deletion processing that inserts or deletes the data in units of samples.

11 Claims, 12 Drawing Sheets

(51) Int. Cl.
  *H04L 49/9057* (2022.01)
  *H04W 4/80* (2018.01)

(56) References Cited

U.S. PATENT DOCUMENTS

| | | |
|---|---|---|
| 2007/0008984 A1 | 1/2007 | Philips et al. |
| 2007/0061135 A1* | 3/2007 | Chu ........................ G10L 19/07 |
| | | 704/E19.025 |
| 2008/0212574 A1* | 9/2008 | Andre ................... H04J 3/0664 |
| | | 370/356 |
| 2017/0365269 A1 | 12/2017 | Kemmochi |
| 2018/0288650 A1 | 10/2018 | Suzuki et al. |
| 2018/0374492 A1 | 12/2018 | Kemmochi |
| 2019/0014050 A1* | 1/2019 | Wang .................. H04L 49/9005 |
| 2019/0221222 A1 | 7/2019 | Kemmochi |

FOREIGN PATENT DOCUMENTS

| | | |
|---|---|---|
| CN | 102300090 A | 12/2011 |
| CN | 107005591 A | 8/2017 |
| CN | 107112019 A | 8/2017 |
| CN | 109155633 A | 1/2019 |
| JP | S63-308422 A | 12/1988 |
| JP | H07-170502 A | 7/1995 |
| JP | 2004-241821 A | 8/2004 |
| JP | 2007-501428 A | 1/2007 |
| JP | 2007-532053 A | 11/2007 |
| JP | 2008139661 A | 6/2008 |
| JP | 2016-126037 A | 7/2016 |
| WO | WO 2005/013639 A2 | 2/2005 |
| WO | WO 2016/088582 A1 | 6/2016 |

OTHER PUBLICATIONS

PCT/JP2020/042022, Dec. 8, 2020, International Search Report.
International Search Report and English translation thereof mailed Dec. 8, 2020 in connection with International Application No. PCT/JP2020/042022.
International Written Opinion and English translation thereof mailed Dec. 8, 2020 in connection with International Application No. PCT/JP2020/042022.
International Preliminary Report on Patentability and English translation thereof mailed May 27, 2022 in connection with International Application No. PCT/JP2020/042022.

* cited by examiner

DATA PROCESSING APPARATUS, DATA PROCESSING METHOD, AND DATA PROCESSING PROGRAM

CROSS-REFERENCE TO RELATED APPLICATIONS

This application claims the benefit under 35 U.S.C. § 371 as a U.S. National Stage Entry of International Application No. PCT/JP2020/042022, filed in the Japanese Patent Office as a Receiving Office on Nov. 11, 2020, which claims priority to Japanese Patent Application Number JP2019-204525, filed in the Japanese Patent Office on Nov. 12, 2019, each of which is hereby incorporated by reference in its entirety.

FIELD

The present disclosure relates to a data processing apparatus, a data processing method, and a data processing program.

BACKGROUND

Conventionally, for example, a system that transmits and receives acoustic data such as music wirelessly using Bluetooth (registered trademark) or the like, is known. In such a system, a technology that enables acoustic data to be temporarily accumulated (stored) in a buffer of a device on a reception side is used.

Furthermore, for example, in a case where the transmission rate of the acoustic data on the transmission side and the output rate of the acoustic data on the reception side are different from each other, in the device on the reception side, shortage (underflow) or saturation (overflow) of the acoustic data in the buffer occurs, thereby sound breaking, sound skipping, or the like occurs. On the other hand, in the conventional system, there has been proposed a technique of suppressing occurrence of sound breaking and sound skipping by inserting or deleting (insertion/deletion processing) acoustic data in units of frames (see, Patent Literature 1, for example). Note that the frame is a unit obtained by dividing all samples included in the acoustic data for each predetermined number of samples.

CITATION LIST

Patent Literature

Patent Literature 1: WO 2016/088582 A

SUMMARY

Technical Problem

However, in the related art, there is room for improvement so that data output interruption such as sound breaking and sound skipping needs to be suppressed with high accuracy. Specifically, since the insertion/deletion processing is conventionally performed in units of frames, it is not considered to have a high followability to fluctuations such as shortage and saturation of buffer, and there is a possibility that output interruption occurs in units of the number of samples included in the frame.

Therefore, the present disclosure has proposed a data processing apparatus, a data processing method, and a data processing program capable of suppressing data output interruption with high accuracy.

Solution to Problem

A data processing apparatus includes a signal processing unit and an insertion/deletion unit. The signal processing unit performs predetermined signal processing on the wirelessly received data for each frame that includes a predetermined number of samples, and stores the data in the buffers. In the case where an amount of the data accumulated in the buffer is out of a predetermined range, the insertion/deletion unit performs insertion/deletion processing that inserts or deletes the data in units of samples.

DESCRIPTION OF EMBODIMENTS

Figure 1A:
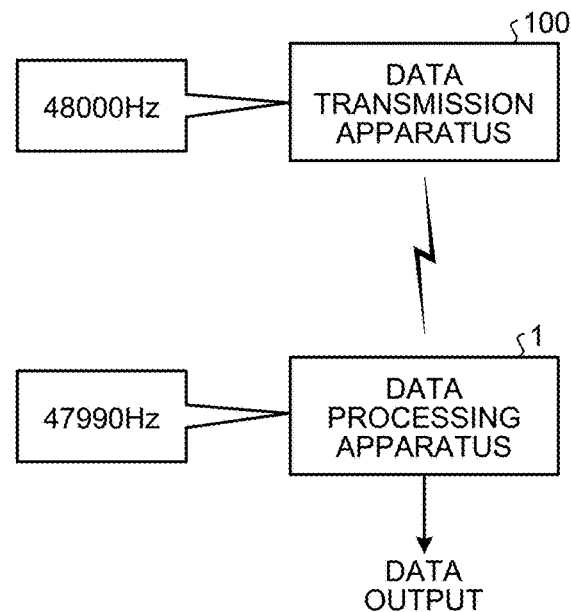
FIG. 1A is a diagram illustrating a configuration of a data processing system according to an embodiment.

Hereinafter, embodiments of the present disclosure will be described in detail with reference to the drawings. In each of the following embodiments, the same parts are denoted by the same reference numerals, and redundant description will be omitted.

Furthermore, in the specification and the drawings, a plurality of constituent elements having substantially the same functional configuration may be distinguished from one another by adding different numbers after the same reference numeral. However, if it is not necessary to distinguish the plurality of constituent elements having substantially the same functional configuration from one another, only the same reference numeral is given.

<<1. Overview of Data Processing Method According to Embodiment>>

Figure 1B:
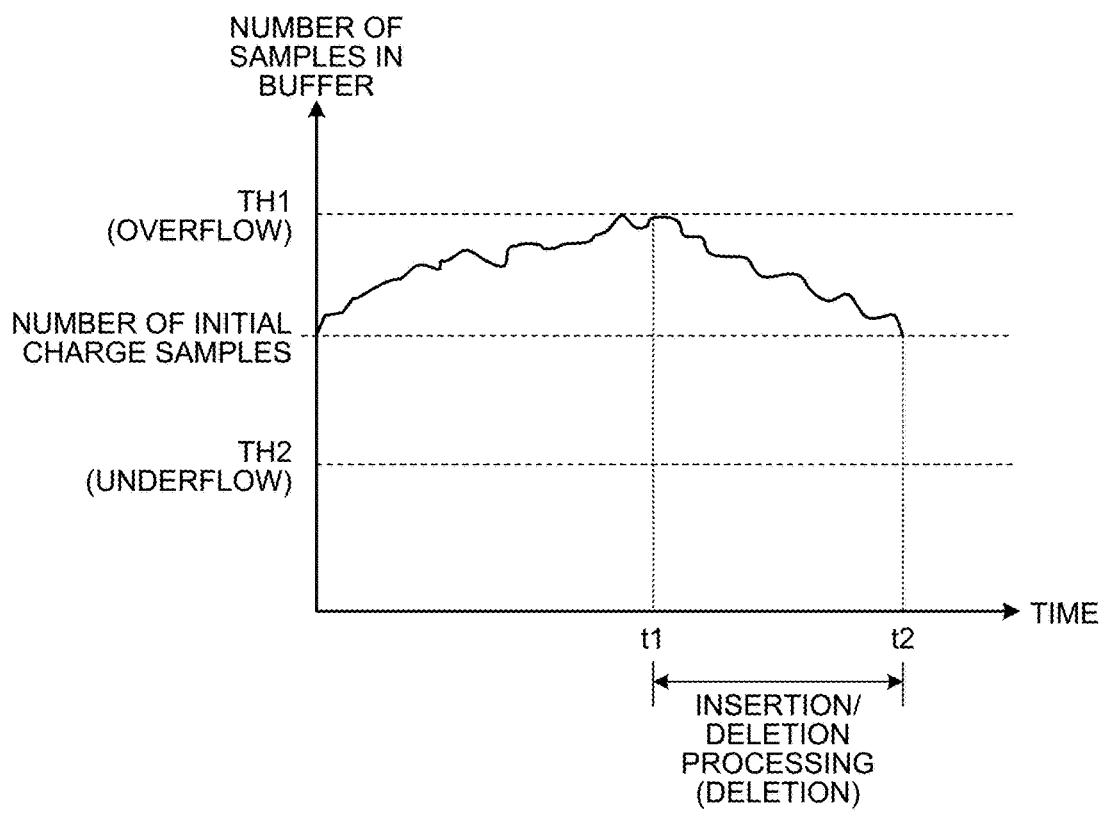
FIG. 1B is a diagram illustrating an overview of a data processing method according to an embodiment.

First, an overview of data processing method according to an embodiment will be described with reference to FIGS. 1A and 1B. FIG. 1A is a diagram illustrating a configuration of a data processing system according to an embodiment. FIG. 1B is a diagram illustrating an overview of a data processing method according to an embodiment. As illustrated in FIG. 1A, the data processing system S includes a data processing apparatus 1 and a data transmission apparatus 100. The data processing apparatus 1 and the data transmission apparatus 100 are connected in compliance with a predetermined wireless communication standard such as Bluetooth (registered trademark), for example, and transmit and receive various data.

The data transmission apparatus 100 is, for example, a device that wirelessly transmits predetermined data such as acoustic data of music or the like. The data transmission apparatus 100 is implemented by, for example, a smartphone, a tablet terminal, a notebook personal computer (PC), a desktop PC, a mobile phone, a personal digital assistant (PDA), or the like. The data transmission apparatus 100 transmits data obtained by performing signal processing such as encoding processing or modulation processing on the data to the data processing apparatus 1. Note that the data transmission apparatus 100 processes data in units of frames. That is, the data transmission apparatus 100 performs encoding processing and modulation processing on data for each frame including a predetermined number of samples, and transmits the data to the data processing apparatus 1 for each frame.

The data processing apparatus 1 is a device that performs signal processing such as demodulation processing or decoding processing on data for each frame received from the data transmission apparatus 100 and outputs the data. The data processing apparatus 1 is, for example, headphones, a loudspeaker, and an electronic device with built-in loudspeaker. In addition, the data processing apparatus 1 includes a buffer that temporarily accumulates (stores) the received data. As a result, it is possible to compensate for a difference (deviation) between the data transmission rate in the data transmission apparatus 100 and the data output rate in the data processing apparatus 1.

Furthermore, the data processing apparatus 1 executes the data processing method according to an embodiment. Here, an example of data processing method according to an embodiment will be described with reference to FIGS. 1A and 1B. As illustrated in FIG. 1A, it assumes that the clock frequency (transmission rate) of data transmission apparatus 100 is 48000 Hz, and the clock frequency (output rate) of data processing apparatus 1 is 47990 Hz.

In other words, in FIG. 1A, the data amount corresponding to 48000 Hz per unit time is transmitted from the data transmission apparatus 100, and the data processing apparatus 1 outputs the data amount corresponding to 47990 Hz per unit time. That is, the amount of data transmitted by the data transmission apparatus 100 is larger than the amount of data output by the data processing apparatus 1.

In such a case, the amount of data accumulated in the buffer in the data processing apparatus 1 increases by the amount of data corresponding to 10 Hz that is the difference in clock frequency. FIG. 1B illustrates a transition of an amount of data accumulated in the buffer over time.

As illustrated in FIG. 1B, in a case where the amount of data transmitted by the data transmission apparatus 100 is larger than the amount of data output by the data processing apparatus 1, for example, in a period to time t1, the data amount gradually increases from the number of initial charge samples, and when the accumulation amount becomes equal to or larger than a predetermined threshold value TH1 at time t1, the data is in a state of saturation (overflow) in the buffer. Note that the initial sample charge is to accumulate a certain amount (the number of samples) in advance so that the shortage of buffer does not occur. For example, the data processing apparatus 1 only stores data in the buffer and does not output the data accumulated in the buffer until the initial sample charge number is reached after the data reception from the data transmission apparatus 100 is started.

Then, in the data processing method according to an embodiment, in a case where the data is saturated in the buffer, deletion processing of deleting a predetermined sample from the data accumulated in the buffer is performed. On the other hand, in a case where the data is shortage (underflow) in the buffer, that is, in a case where the accumulation amount of the buffer is equal to or less than the predetermined threshold value TH2, insertion processing of inserting a predetermined sample into the data accumulated in the buffer is performed.

That is, in the data processing method according to an embodiment, in a case where an amount of the data accumulated in the buffer is out of a predetermined range (out of the range of the threshold value TH1 and the threshold value TH2), any one of insertion and deletion of insertion/deletion processing is performed on the data in units of samples.

For example, in FIG. 1B, after time t1, by performing the deletion processing on the data in the buffer, the amount of the data accumulated in the buffer decreases. Specifically, since the data amount corresponding to 47980 Hz is substantially obtained by deleting the data amount corresponding to 20 Hz in the data amount corresponding to 48000 Hz, the data amount corresponding to 10 Hz is decreased for each time the data processing apparatus 1 outputs the data amount corresponding to 47990 Hz.

As a result, shortage and saturation of data in the buffer can be resolved. Furthermore, in the data processing method according to an embodiment, it is possible to follow the buffer fluctuation in units of samples by performing the insertion/deletion processing on the data in units of samples, as compared with the case of following the buffer fluctuation in units of frames by performing the insertion/deletion processing in units of frames in the related art. That is, according to the data processing method according to an embodiment, data output interruption can be suppressed with high accuracy.

<<2. Configuration of Data Transmission Apparatus According to Embodiment>>

Figure 2:
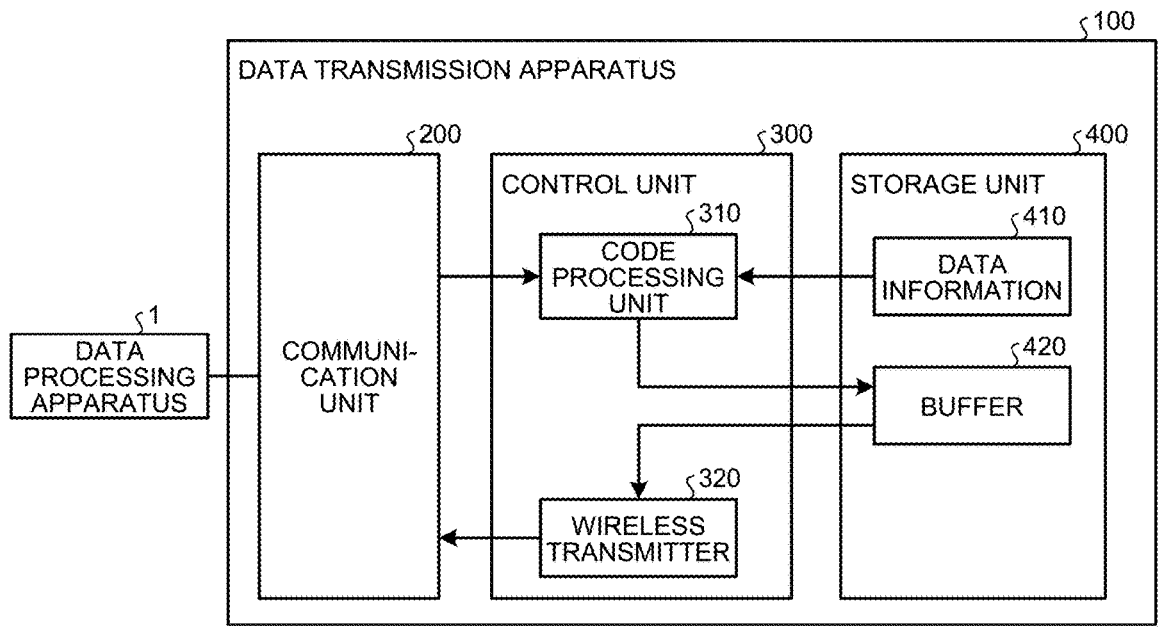
FIG. 2 is a block diagram illustrating a configuration of a data transmission apparatus according to an embodiment.

Next, a configuration of the data transmission apparatus 100 according to an embodiment will be described with reference to FIG. 2. FIG. 2 is a block diagram illustrating a configuration of the data transmission apparatus 100 according to an embodiment. As illustrated in FIG. 2, the data transmission apparatus 100 is communicably connected to the data processing apparatus 1.

In addition, the transmission apparatus 100 includes a communication unit 200, a control unit 300, and a storage unit 400. The communication unit 200 transmits and receives various data to and from the data processing apparatus 1 in compliance with a predetermined wireless communication standard such as Bluetooth (registered trademark), for example.

The control unit 300 includes a code processing unit 310 and a wireless transmitter 320. The storage unit 400 stores data information 410. In addition, the storage unit 400 has an area of a buffer 420 that temporarily stores data.

Here, the data transmission apparatus 100 includes, for example, a computer including a central processing unit (CPU), read only memory (ROM), random access memory (RAM), data flash, an input/output port, and the like, and various circuits.

The CPU of the computer functions as the code processing unit 310 and the wireless transmitter 320 of the control unit 300, for example, by reading and executing a program stored in the ROM.

In addition, at least one or both of the code processing unit 310 and the wireless transmitter 320 of the control unit 300 may be configured by hardware such as an application specific integrated circuit (ASIC) or a field programmable gate array (FPGA).

Furthermore, the storage unit 400 corresponds to, for example, RAM or a data flash. The RAM and the data flash can store the data information 410, information of various programs, and the like. Note that the data transmission apparatus 100 may acquire the above-described program and various types of information via another computer or portable recording medium connected via a wired or wireless network.

The data information 410 stored in the storage unit 400 is data to be wirelessly transmitted from the data transmission apparatus 100 to the data processing apparatus 1, in other words, data as a target of insertion/deletion processing in the data processing apparatus 1. The data in the data information 410 is, for example, music or moving image data.

The buffer 420 is a storage area in which data encoded by the code processing unit 310 described later is temporarily stored.

The code processing unit 310 of the control unit 300 reads the data information 410 stored in the storage unit 400, performs predetermined encoding processing, and temporarily stores data compressed by the encoding processing in the buffer 420.

For example, Bluetooth (registered trademark) defines the advanced audio distribution profile (A2DP) as a profile for transmitting and receiving acoustic data. For example, the A2DP defines an essential codec (mandanrtory codec) called a subband codec (SBC). That is, the code processing unit 310 compresses linear pulse code modulation (LPCM) data, which is acoustic data, by the SBC.

Then, the code processing unit 310 encodes the compressed data using a predetermined encoder. For example, the code processing unit 310 encodes the LPCM data by the encoder of the SBC in units of frames including a predetermined number of samples, and temporarily stores the data in units of frames that is encoded (encoded data) in the buffer 420.

The wireless transmitter 320 reads the encoded data stored in the buffer 420, performs modulation according to a communication standard, and transmits the data to the data processing apparatus 1. Specifically, first, the wireless transmitter 320 reads the encoded data from the buffer 420 in units of frames and packetizes the encoded data.

Subsequently, the wireless transmitter 320 modulates the packetized data into a radio frequency (RF) signal and wirelessly transmits the RF signal to the data processing apparatus 1 via the communication unit 200.

<<3. Configuration of Data Processing Apparatus According to Embodiment>>

Figure 3:
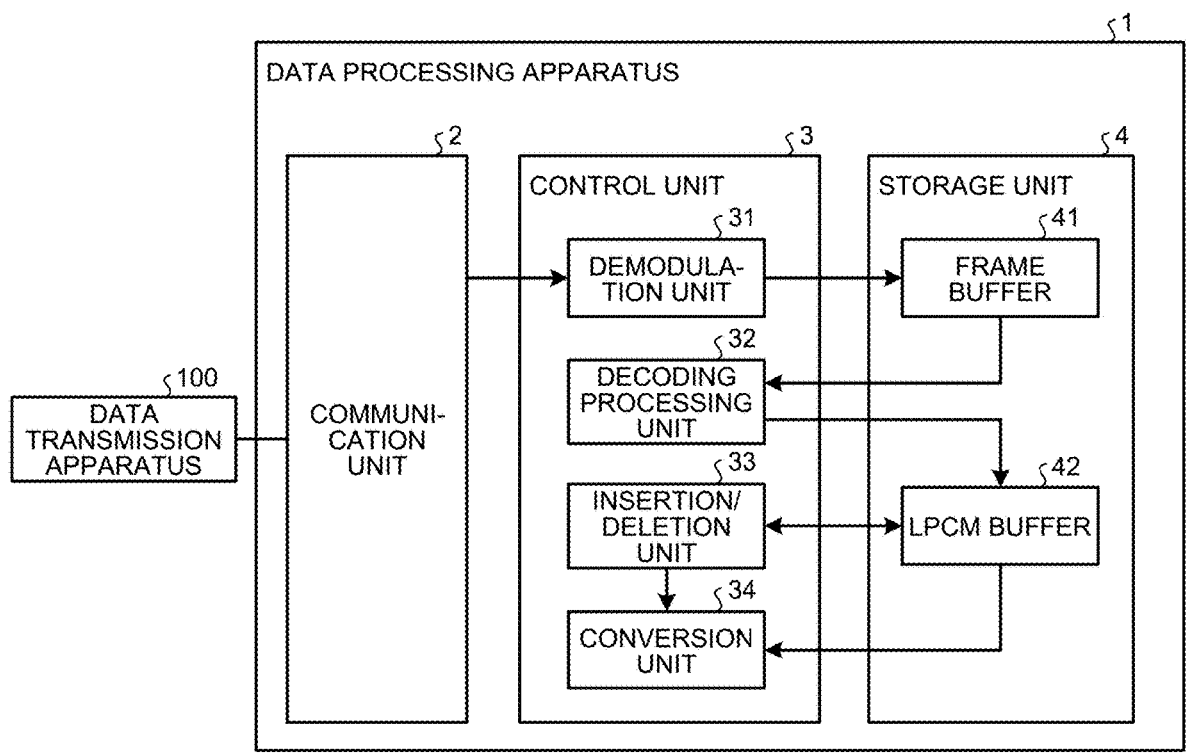
FIG. 3 is a block diagram illustrating a configuration of a data processing apparatus according to an embodiment.

Next, a configuration of the data processing apparatus 1 according to an embodiment will be described with reference to FIG. 3. FIG. 3 is a block diagram illustrating the configuration of the data processing apparatus 1 according to an embodiment. As illustrated in FIG. 3, the data processing apparatus 1 is communicably connected to the data transmission apparatus 100.

In addition, the data processing apparatus 1 includes a communication unit 2, a control unit 3, and a storage unit 4. The communication unit 2 transmits and receives various data to and from the data processing apparatus 1 in compliance with a predetermined wireless communication standard such as Bluetooth (registered trademark), for example.

The control unit 3 includes a demodulation unit (an example of a signal processing unit), a decoding processing unit 32 (an example of a signal processing unit), an insertion/deletion unit 33, and a conversion unit 34. The storage unit 4 has an area of a frame buffer 41 and an LPCM buffer 42 that temporarily store data.

Here, the data processing apparatus 1 includes, for example, a computer including a central processing unit (CPU), read only memory (ROM), random access memory (RAM), data flash, an input/output port, and the like, and various circuits.

The CPU of the computer functions as the demodulation unit 31 of the control unit 3, the decoding processing unit 32, the insertion/deletion unit 33, and the conversion unit 34, for example, by reading and executing a program stored in the ROM.

In addition, at least one or all of the demodulation unit 31 of the control unit 3, the decoding processing unit 32, the insertion/deletion unit 33, and the conversion unit 34 may be configured by hardware such as an application specific integrated circuit (ASIC) or a field programmable gate array (FPGA).

Furthermore, the storage unit 4 corresponds to, for example, RAM or a data flash. The RAM and the data flash can store information of various programs, and the like. Note that the data processing apparatus 1 may acquire the above-described program and various types of information via another computer or portable recording medium connected via a wired or wireless network.

The frame buffer 41 is a storage area in which encoded data obtained by demodulating an RF signal using the demodulation unit 31 described later is temporarily stored.

The LPCM buffer 420 is a storage area in which the LPCM data, which is data obtained by decoding encoded data using the decoding processing unit 32 described later, is temporarily stored.

The demodulation unit 31 demodulates the RF signal received from the data transmission apparatus 100, and temporarily stores, in the frame buffer 41, encoded data obtained by decomposing the packet obtained by the demodulation. The demodulation unit 31 stores the encoded data in units of frames in the frame buffer 41. That is, the demodulation unit 31 is an example of a signal processing unit that performs predetermined signal processing (demodulation processing and packet decomposition processing) on the wirelessly received data (RF signal) for each frame including a predetermined number of samples and stores the data in the buffer (frame buffer 41).

The decoding processing unit 32 decodes the encoded data stored in the frame buffer 41 using a predetermined decoder. The decoding processing unit 32, for example, decodes the encoded data in units of frames including a predetermined number of samples by the decoder of the SBC, and temporarily stores the decoded data in units of frames (LPCM data) in the LPCM buffer 42.

In a case where an amount of the data accumulated in the buffer is out of a predetermined range, the insertion/deletion unit 33 performs any one of insertion and deletion of insertion/deletion processing on the data in units of samples. For example, the insertion/deletion unit 33 performs the insertion/deletion processing on the LPCM data in units of samples, in a case where an amount of the LPCM data accumulated in the LPCM buffer 42 is out of a predetermined range.

Specifically, in a case where an amount of the LPCM data accumulated in the LPCM buffer 42 is equal to or larger than a predetermined threshold (for example, the threshold value TH1 illustrated in FIG. 1), the insertion/deletion unit 33 detects saturation of the LPCM buffer 42 and performs deletion processing of a predetermined sample. On the other hand, in a case where an amount of the LPCM data accumulated in the LPCM buffer 42 is equal to or smaller than a predetermined threshold (for example, the threshold value TH2 illustrated in FIG. 1), the insertion/deletion unit 33 detects shortage of the LPCM buffer 42 and performs insertion processing of a predetermined sample.

Here, processing contents of the insertion/deletion unit 33 will be specifically described with reference to FIGS. 4 to 8. FIGS. 4 to 8 are diagrams illustrating processing contents of the insertion/deletion unit 33.

Figure 4:
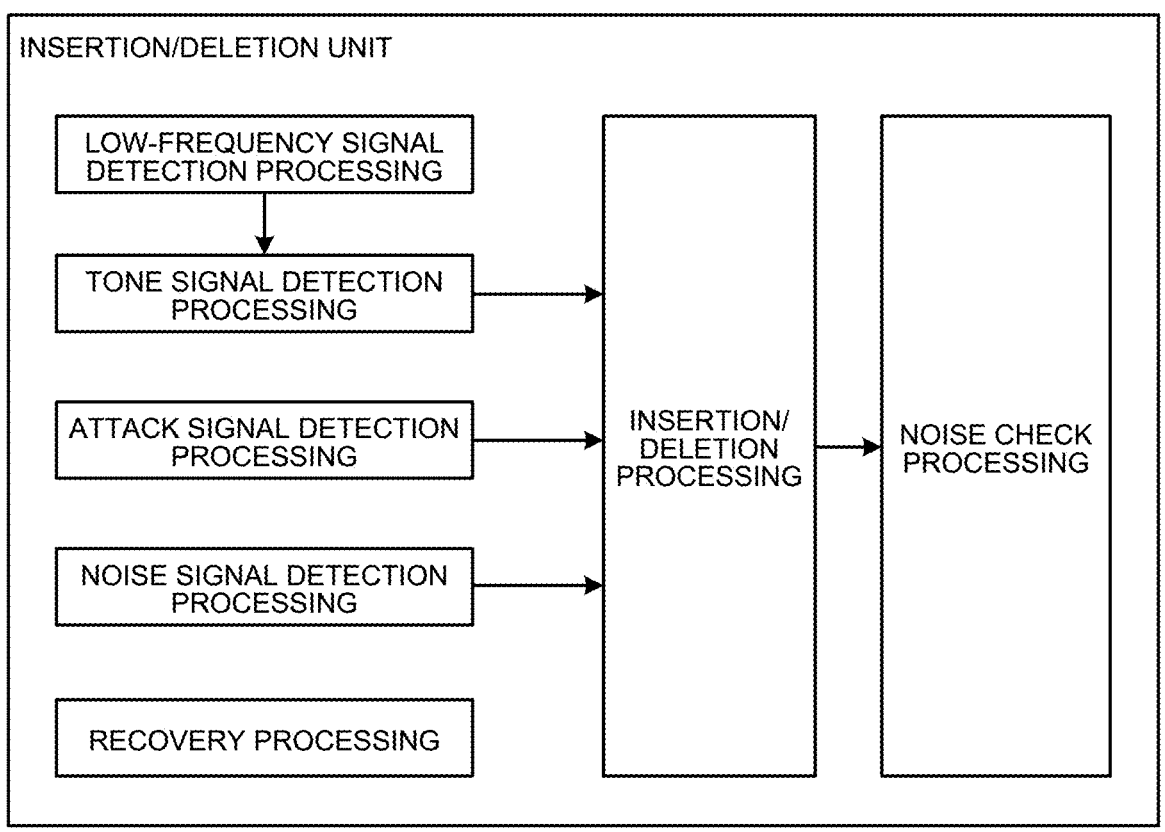
FIG. 4 is a diagram illustrating processing contents of an insertion/deletion unit.

As illustrated in FIG. 4, the insertion/deletion unit 33 performs low-frequency signal detection processing, tone signal detection processing, attack signal detection processing, noise signal detection processing, recovery processing, insertion/deletion processing, and noise check processing. Among the above-described processing, the low-frequency signal detection processing, the tone signal detection processing, the attack signal detection processing, and the noise signal detection processing are processing of detecting whether or not data (data in units of frames) that is acoustic data can be inserted and deleted, and are processing of detecting, for example, whether or not a range that is difficult to be perceived by human hearing is included in the frame. Hereinafter, each processing will be specifically described.

<Low-Frequency Signal Detection Processing>

The low-frequency signal detection processing is processing of detecting a sample having a relatively low signal level in a frame as a target of insertion/deletion processing (target to be inserted or deleted). Here, the low-frequency signal detection processing will be specifically described with reference to FIGS. 5 and 6.

Figure 5:
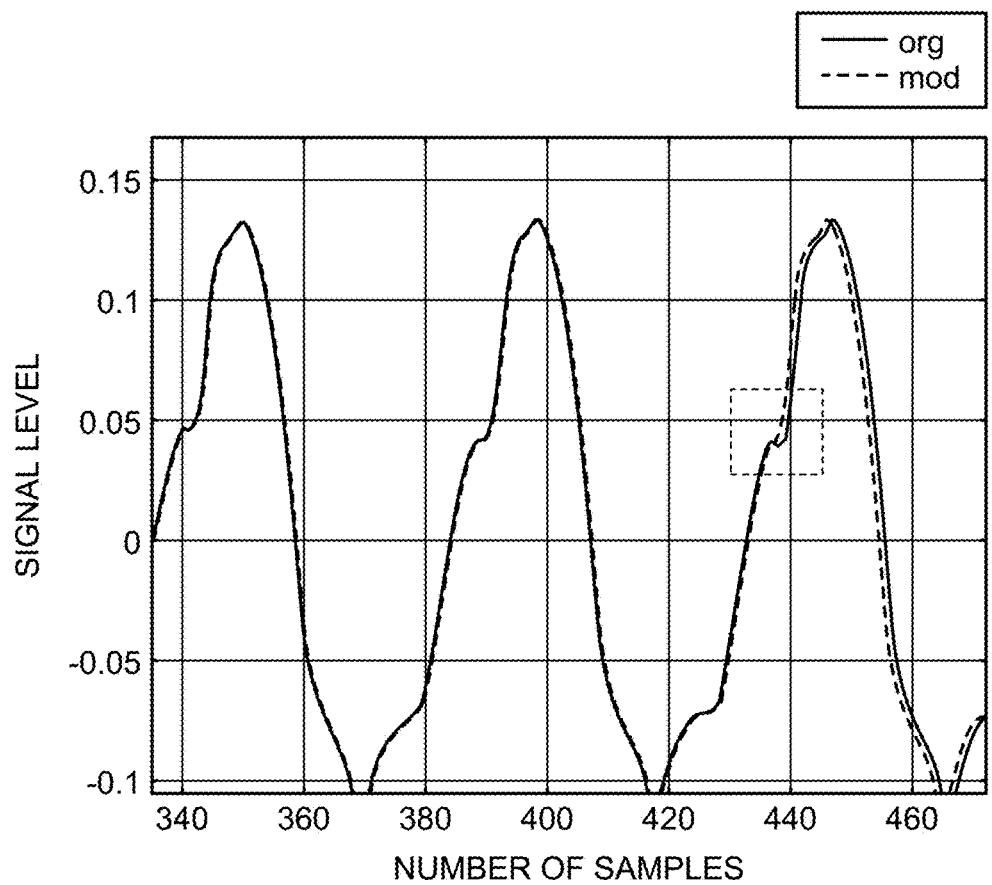
FIG. 5 is a diagram illustrating processing contents of an insertion/deletion unit.
Figure 6:
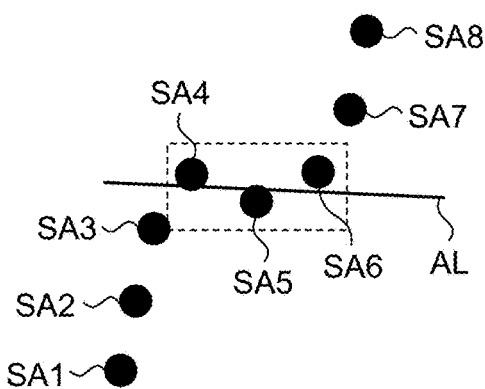
FIG. 6 is a diagram illustrating processing contents of an insertion/deletion unit.

FIG. 5 illustrates 128 samples corresponding to one frame. Furthermore, in FIG. 5, the frame before the insertion/deletion processing is indicated by a solid line, and the frame after the deletion processing is indicated by a broken line. In FIG. 6, a region surrounded by a broken line in FIG. 5 (only the frame before the insertion/deletion processing) is illustrated in an enlarged manner, and one black circle corresponds to one sample.

First, the insertion/deletion unit 33 sorts the absolute values of the signal levels in ascending order (or descending order) for the samples illustrated in FIG. 5, which are data read from the LPCM buffer 42 in units of frames. Note that, in the sorting result, a sample position (time) in the frame is associated with each sample. Then, the insertion/deletion unit 33 selects a predetermined number or more of samples in which absolute values are less than a predetermined value (for example, less than 0.05). The number of samples to be selected is preferably equal to or larger than the number of samples to be inserted and deleted required for the insertion/deletion processing. Note that the insertion/deletion unit 33 may select a sample in which the absolute value of the signal level is less than the predetermined value from the waveform data illustrated in FIG. 5 without performing the sorting processing.

Subsequently, the insertion/deletion unit 33 selects, for each selected sample, three samples including samples located before and after the sample as candidates for the target to be inserted or deleted. That is, the insertion/deletion unit 33 sets three consecutive samples whose signal levels are less than a predetermined value as targets to be inserted or deleted. Here, when the signs of the signal levels of the three samples that are candidates for the targets to be inserted or deleted are inverted, the insertion/deletion unit 33 excludes the three samples from the candidates for targets to be inserted or deleted. Specifically, in a case where three consecutive samples are inverted, for example, as +, −, +, −, +, −, +, or −, the insertion/deletion unit 33 excludes the three samples from candidates for targets to be inserted or deleted.

Subsequently, the insertion/deletion unit 33 calculates an approximate line (straight line) in the candidates for targets to be inserted or deleted, which are three samples including each selected sample and samples located before and after the sample. Here, a method of calculating the approximate line will be described with reference to FIG. 6. FIG. 6 illustrates eight consecutive samples, and it is assumed that the sample SA5 is a sample selected, and three consecutive samples SAL4 to SAL6 are candidates for targets to be inserted or deleted.

In the example illustrated in FIG. 6, the insertion/deletion unit 33 calculates an approximate line AL from three consecutive samples SA4 to SA6 by the least squares method using samples SA4 and SA6 located before and after the selected sample SA5. In a case where the sorting processing is performed, it is preferable to associate information indicating that the approximate line AL is calculated based on the sample position before the sorting processing with the information of the approximate line AL. In addition, the number of samples for calculating the approximate line AL is not limited to three, and may be two or four or more.

Then, in a case where the inclination of the approximate line AL calculated is less than the predetermined threshold, the insertion/deletion unit 33 detects the sample as a low-frequency signal and determines the three consecutive samples SA4 to SA6 as targets to be inserted or deleted. That is, since it has been found by an experiment or the like that a portion where the signal level is relatively low and the change in the signal level with respect to the preceding and following samples is small is difficult to be perceived by human hearing, the sample of such a portion is determined as the target to be inserted or deleted. That is, the insertion/deletion unit 33 causes a consecutive predetermined number of the samples SA4 to SA6 to be a target to be inserted or deleted in the frame in a case where a slope of an approximate line AL calculated on the basis of the consecutive predetermined number of samples SA4 to SA6 is less than a predetermined threshold value. As a result, even when a sample is inserted and deleted in the insertion/deletion processing to be described later, a person is less likely to feel wrongness in the frame after the insertion/deletion processing.

The insertion/deletion unit 33 performs tone signal detection processing on a frame including a target to be inserted or deleted.

<Tone Signal Detection Processing>

The tone signal processing is processing of detecting whether or not a tone signal is included in a frame. The tone signal is a special signal such as a sine wave, and is a signal that may possibly be determined as a target to be inserted or deleted in the above-described low-frequency signal detection processing and the like. Therefore, in a case where a tone signal is included in the frame, the insertion/deletion unit 33 excludes the frame from the target to be inserted or deleted. That is, in a case where the waveform of the sample in the frame is the tone waveform corresponding to the tone signal, the insertion/deletion unit 33 excludes the frame from the target to be inserted or deleted. Note that the tone signal can be detected by, for example, waveform pattern matching or known signal analysis processing.

Then, the insertion/deletion unit 33 performs insertion/deletion processing on a frame from which any tone signal has not been detected.

<Attack Signal Detection Processing>

The attack signal detection processing is processing of detecting whether or not an attack signal is included in a frame. The attack signal is, for example, a signal whose signal level temporarily increases due to percussive sounds such as castanets. The insertion/deletion unit 33 determines a target to be inserted or deleted using an auditory masking phenomenon caused by the attack signal. In other words, in a case where the frame includes the attack waveform corresponding to an attack waveform having a change in signal levels of the sample equal to or larger than a predetermined value, the insertion/deletion unit 33 causes a sample corresponding to an attack waveform to be a target to be inserted or deleted. Specifically, the insertion/deletion unit 33 sets the attack signal as a masker, and determines a sample within a range of time when the masking phenomenon occurs (time when the signal level temporarily increases) as a target to be inserted or deleted.

Specifically, the insertion/deletion unit 33 first divides the samples read from the LPCM buffer 42 in units of frames into a predetermined number, and calculates an average value of signal levels for each of the divided sample ranges. Subsequently, the insertion/deletion unit 33 detects, as an attack signal, a sudden change range (and sample ranges before and after the sudden change range) in which a change in the calculated average value of the signal levels of each sample range is a predetermined value or more, and determines a sample in the sample range corresponding to the attack signal as a target to be inserted or deleted.

In addition, the insertion/deletion unit 33 calculates the attack signal level on the basis of the ratio of the average values of the signal levels of the sudden change range and the sample ranges before and after the sudden change range. For example, the insertion/deletion unit 33 increases the attack signal level as the ratio of the average values of the signal levels of the sudden change range increases to the sample ranges before and after the sudden change range. That is, the insertion/deletion unit 33 increases the attack signal level as the degree of sudden change increases. Note that the attack signal level is used to determine the number of insertions and deletions when insertion/deletion processing to be described later is performed.

<Noise Signal Detection Processing>

The noise signal processing is processing of detecting whether or not a noise signal is included in a frame. The noise signal is acoustic data having strong randomness and small tonality, that is, acoustic data having high temporal discontinuity. Examples of the noise signal include a sound of a wave, white noise, a consonant portion of a sound, and a musical instrument sound of cymbal or maracas, or the like. It is known that such a noise signal is difficult to be perceived by human hearing even if a sample is inserted and deleted by an experiment or the like. Therefore, the insertion/deletion unit 33 detects a noise signal to detect a sample corresponding to the noise signal as a target to be inserted or deleted. In other words, in a case where a noise waveform corresponding to a temporal discontinuous noise signal is included in a waveform of a sample in the frame, the insertion/deletion unit 33 causes the sample corresponding to the noise waveform to be a target to be inserted or deleted.

For example, the insertion/deletion unit 33 can detect the noise signal by calculating variance and correlation of frequency components of the frame, a difference between a maximum value and a minimum value or an average value of the frequency components (frequency component difference), and the like.

<Insertion/Deletion Processing>

Figure 7:
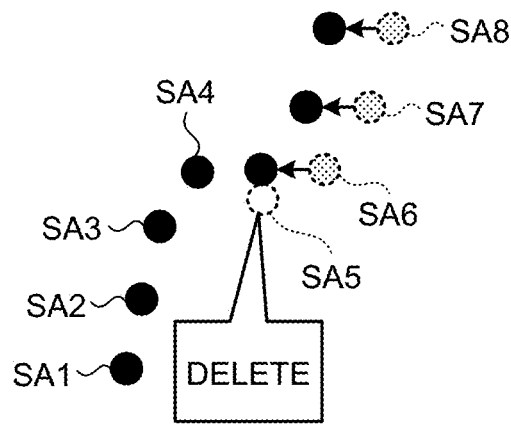
FIG. 7 is a diagram illustrating processing contents of an insertion/deletion unit.
Figure 8:
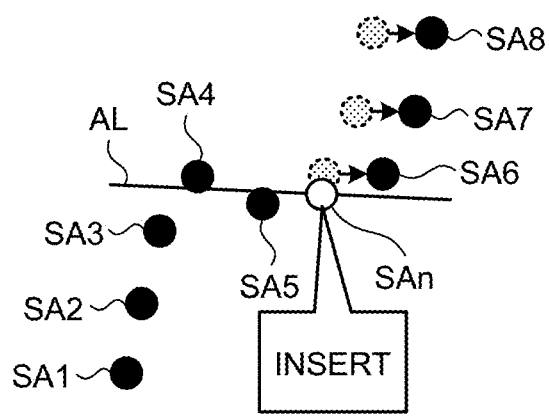
FIG. 8 is a diagram illustrating processing contents of an insertion/deletion unit.

The insertion/deletion processing is performed to a target to be inserted or deleted. Specifically, the insertion/deletion unit 33 performs the insertion/deletion processing to the sample as a target to be inserted or deleted determined by low-frequency signal detection processing, tone signal detection processing, attack signal detection processing, and noise signal detection processing. FIGS. 7 and 8 illustrate insertion processing and deletion processing of a sample.

First, the deletion processing will be described with reference to FIG. 7. In FIG. 7, it is assumed that samples SA4 to SA6 are determined as targets to be inserted or deleted. In such a case, the insertion/deletion unit 33 deletes one of the samples SA4 to SA6 to be inserted or deleted. FIG. 7 illustrates a case where the sample SA5 is to be deleted.

As illustrated in FIG. 7, in a case where the sample SA5 is deleted, the insertion/deletion unit 33 advances positions of the samples SA6 to SA8 subsequent to the sample SA5. That is, the insertion/deletion unit 33 moves the sample SA6 forward to the position of the deleted sample SA5, moves the sample SA7 forward to the position of the sample SA6, and moves the sample SA8 forward to the position of the sample SA7. FIG. 7 illustrates a case where one sample SA5 is deleted, but two or more samples may be deleted, or all of three samples SA4 to SA6 may be deleted.

Next, the insertion processing will be described with reference to FIG. 8. In FIG. 8, it is assumed that samples SA4 to SA6 are determined as targets to be inserted or deleted. In such a case, the insertion/deletion unit 33, for example, inserts a sample between SA4 and SA6 to be inserted or deleted.

Specifically, the insertion/deletion unit 33 inserts a new sample SAn between the sample SA5 and the sample SA6 on the approximate line AL. More specifically, the insertion/deletion unit 33 inserts the sample SAn in the position of the sample SA6, and moves the samples SA6 to SA8 subsequent to the sample SA6. That is, the insertion/deletion unit 33 moves the sample SA6 backward to the position of the deleted sample SA7, moves the sample SA7 backward to the position of the sample SA8, and moves the sample SA8 to the position of the next sample SA8.

In FIG. 8, the new sample SAn is inserted between the samples SA5 and SA6, however, the sample SAn may be inserted between the samples SA4 and SA5, or the sample SAn may be inserted between the samples SA5 and SA6 and between the samples SA4 and SA5. In addition, it is not limited to the case where a new sample SAn is inserted between the samples SA4 to SA6, and a new sample SAn may be inserted between the samples SA3 and SA4 or between the samples SA6 and SA7.

In addition, FIG. 8 illustrates a case where the new sample SAn is inserted on the approximate line AL, however for example, the average value of the signal levels of the samples SA4 to SA6 may be used as the value of the new sample SAn.

<Noise Check Processing>

The noise check processing checks whether or not noise occurs in the frame on which the insertion/deletion processing has been performed. Specifically, the insertion/deletion unit 33 compares the frame before the insertion/deletion processing, that is, the frame of data received from the data transmission apparatus 100, with the frame after the insertion/deletion processing, and checks whether or not noise occurs in the frame after the insertion/deletion processing. Then, in a case where no noise occurs in the frame after the insertion/deletion processing, the insertion/deletion unit 33 replaces the frame before the insertion/deletion processing stored in the LPCM buffer 42 with the frame after the insertion/deletion processing.

On the other hand, in a case where a high-frequency noise check or a pitch gain check to be described later detects that noise occurs, the insertion/deletion unit 33 maintains the frame before the insertion/deletion processing stored in the LPCM buffer 42. That is, in a case where noise occurs in the frame after the insertion/deletion processing, the insertion/deletion unit 33 prohibits replacing the frame before the insertion/deletion processing stored in the LPCM buffer 42 with the frame after the insertion/deletion processing. In other words, the insertion/deletion unit 33 causes data before the insertion/deletion processing to be a target to be output in a case where noise is determined to occur in data after the insertion/deletion processing on the basis of a result obtained by comparing pieces of the data (frames) before and after the insertion/deletion processing upon the insertion/deletion processing. The target to be output is data to be read and output from the LPCM buffer 42 by the conversion unit 34 described later.

Hereinafter, the high-frequency noise check and the pitch gain check will be described.

The high-frequency noise check is processing of evaluating whether or not a high-frequency noise is generated by the insertion/deletion processing. Specifically, the insertion/deletion unit 33 first applies a high-pass filter (HPF) to each of the frame before insertion and deletion and the frame after insertion and deletion to extract a high-pass signal. Note that the frequency to be passed by the HPF can be arbitrarily set, and is set on the basis of the high-frequency noise to be detected.

Subsequently, the insertion/deletion unit 33 calculates a root mean square (RMS) value of the extracted high-frequency signal, and calculates a ratio of the RMS values in the frames before and after the insertion/deletion processing. For example, in a case where the RMS value in the frame after the insertion/deletion processing is RMS1 and the RMS value in the frame before the insertion/deletion processing is RMS2, the ratio of the RMS values=RMS1/RMS2 is calculated.

In a case where the ratio of the RMS values exceeds a predetermined threshold (for example, 5), the insertion/deletion unit 33 determines that high-frequency noise has occurred in the frame after the insertion/deletion processing. On the other hand, in a case where the ratio of the RMS values is equal to or less than the predetermined threshold, the insertion/deletion unit 33 determines that high-frequency noise has not occurred in the frame after the insertion/deletion processing.

Next, the pitch gain check is processing of evaluating whether or not a pitchability signal having strong pitchability is included in the low band of the frame. In the case of the pitchability signal, it has been found by experiments and the like that an abnormal sound may be perceived by human hearing when the insertion/deletion processing is performed. Therefore, the insertion/deletion unit 33 detects the pitchability signal as noise.

For example, the frame illustrated in FIG. 5 includes the pitchability signal and has a flat section around each of 340, 390, and 440 samples, and the periphery of 440 samples among them is a target to be inserted or deleted. However, when the insertion/deletion processing as illustrated in FIGS. 7 and 8 is performed on the periphery of 440 samples, the flat section becomes longer or shorter, so that pitch fluctuation occurs, and abnormal noise may be perceived. Regarding the detection of the pitchability signal, for example, a low pass filter (LPF) is applied to the frames before and after the insertion/deletion processing to extract a low-frequency signal, then linear predictive coding (LPC) is applied to the low-frequency signal, and whether or not the pitch gain is equal to or greater than a predetermined threshold is determined on the basis of the signal finally obtained.

For example, the insertion/deletion unit 33 detects a pitchability signal that is noise in a case where a pitch gain in the signal after LPC exceeds a predetermined threshold value, and determines that the pitchability signal is not included in a case where the pitch gain is equal to or less than the predetermined threshold value.

<Recovery Processing>

The recovery processing is processing of adjusting a sampling rate (corresponding to a clock frequency) in a case where a target to be inserted or deleted does not exist due to the low-frequency signal detection processing, the tone signal detection processing, the attack signal detection processing, and the noise signal detection processing described above although the insertion/deletion processing is necessary, a case where the insertion/deletion processing cannot be performed on the target to be inserted or deleted due to the noise check processing, or the like. That is, in the recovery processing, sampling rate adjustment is performed on the frame.

Specifically, the sampling rate adjustment is processing of converting the sampling rate of the frame into a specified value by digital filter processing.

Here, it is assumed that the frame stored in the LPCM buffer 42 is sampled at a rate of 48000 Hz in the data transmission apparatus 100. Under such conditions, for example, in a case where the insertion processing is required, the frame of the sampling rate of 48000 Hz is converted into the frame of the sampling rate of 48010 Hz by the sampling rate adjustment, and on the other hand, in a case where the deletion processing is required, the frame of the sampling rate of 48000 Hz is converted into the frame of the sampling rate of 47990 Hz.

More specifically, the insertion/deletion unit 33 performs sampling rate conversion processing using a finite impulse response (FIR) filter. For example, in a case where frames for which the insertion/deletion processing cannot be performed are consecutive frames for a predetermined number or more, the insertion/deletion unit 33 performs the conversion processing of the sampling rate by the FIR filter. In other words, the insertion/deletion unit 33 increases or decreases the samples in number to be output in the frame on the basis of the samples in number necessary to be subjected to the insertion/deletion processing in a case where the frames without a target to be inserted or deleted are consecutive frames for a predetermined number or more.

The conversion unit 34 reads the LPCM data stored in the LPCM buffer 42 in chronological order of storage, performs DA conversion, and outputs the converted LPCM data.

<<4. Flowchart of Data Processing>>

Figure 9:
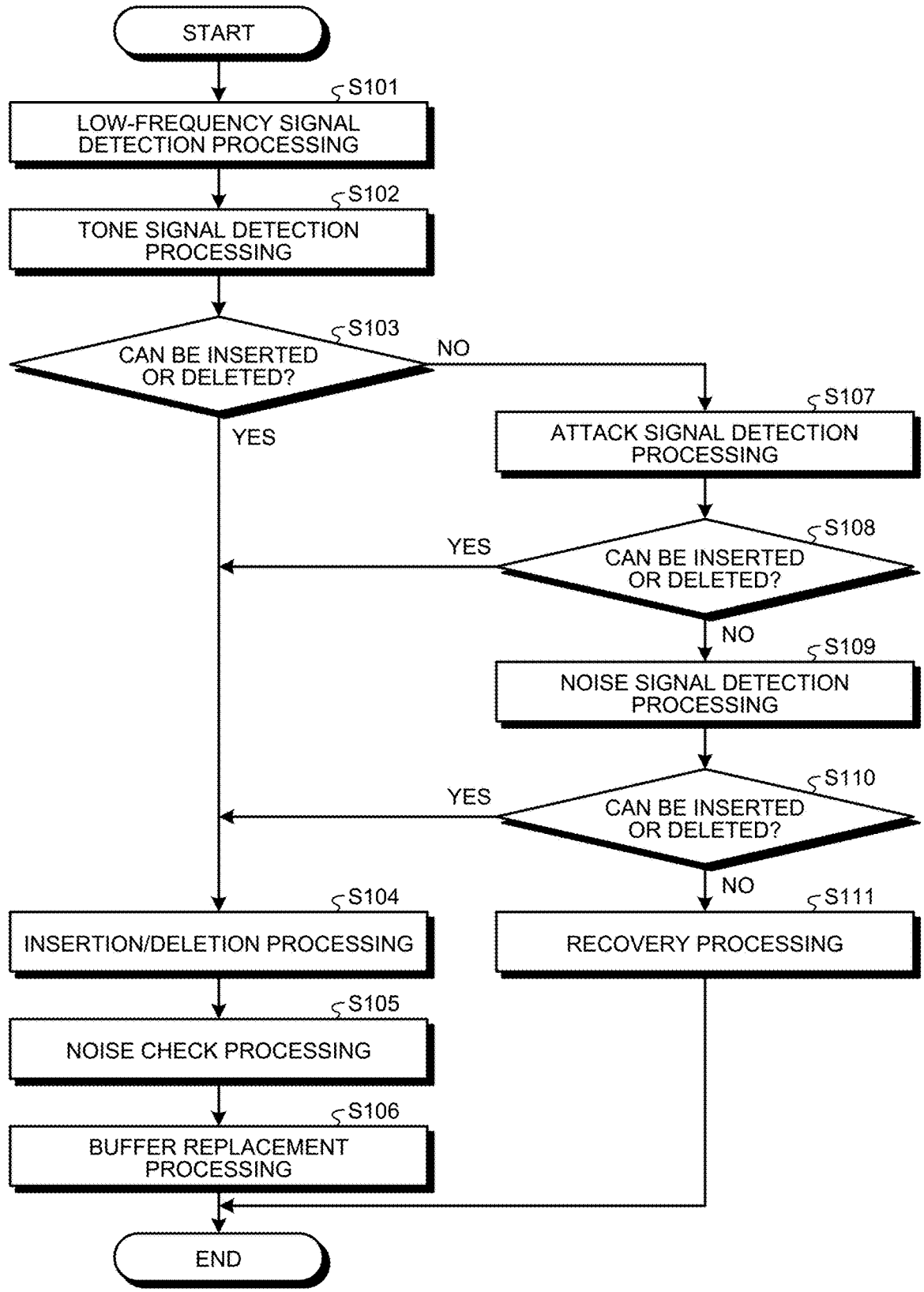
FIG. 9 is a flowchart illustrating a procedure of entire processing executed by a data processing apparatus according to an embodiment.
Figure 10:
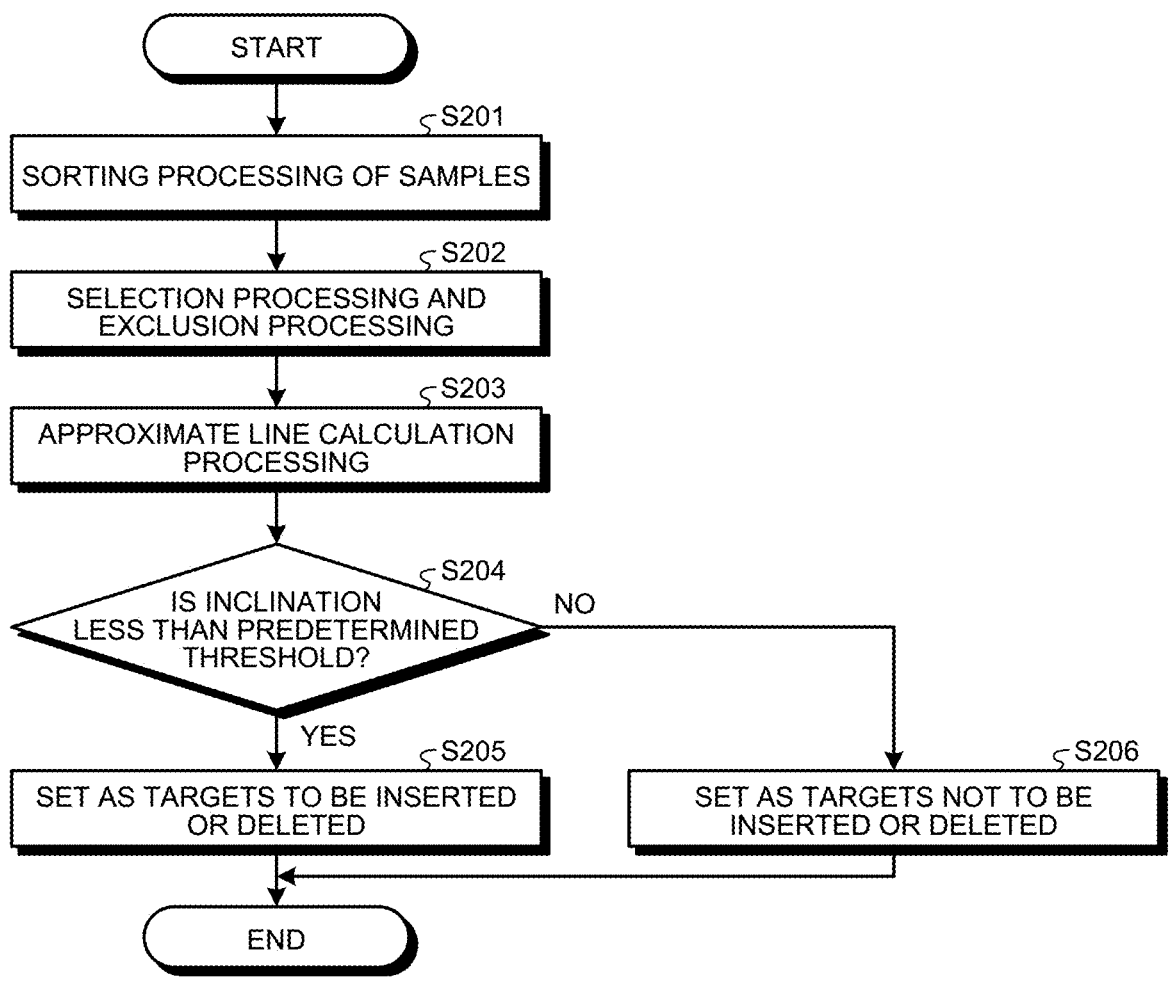
FIG. 10 is a flowchart illustrating a procedure of low-frequency signal detection processing executed by a data processing apparatus according to an embodiment.
Figure 11:
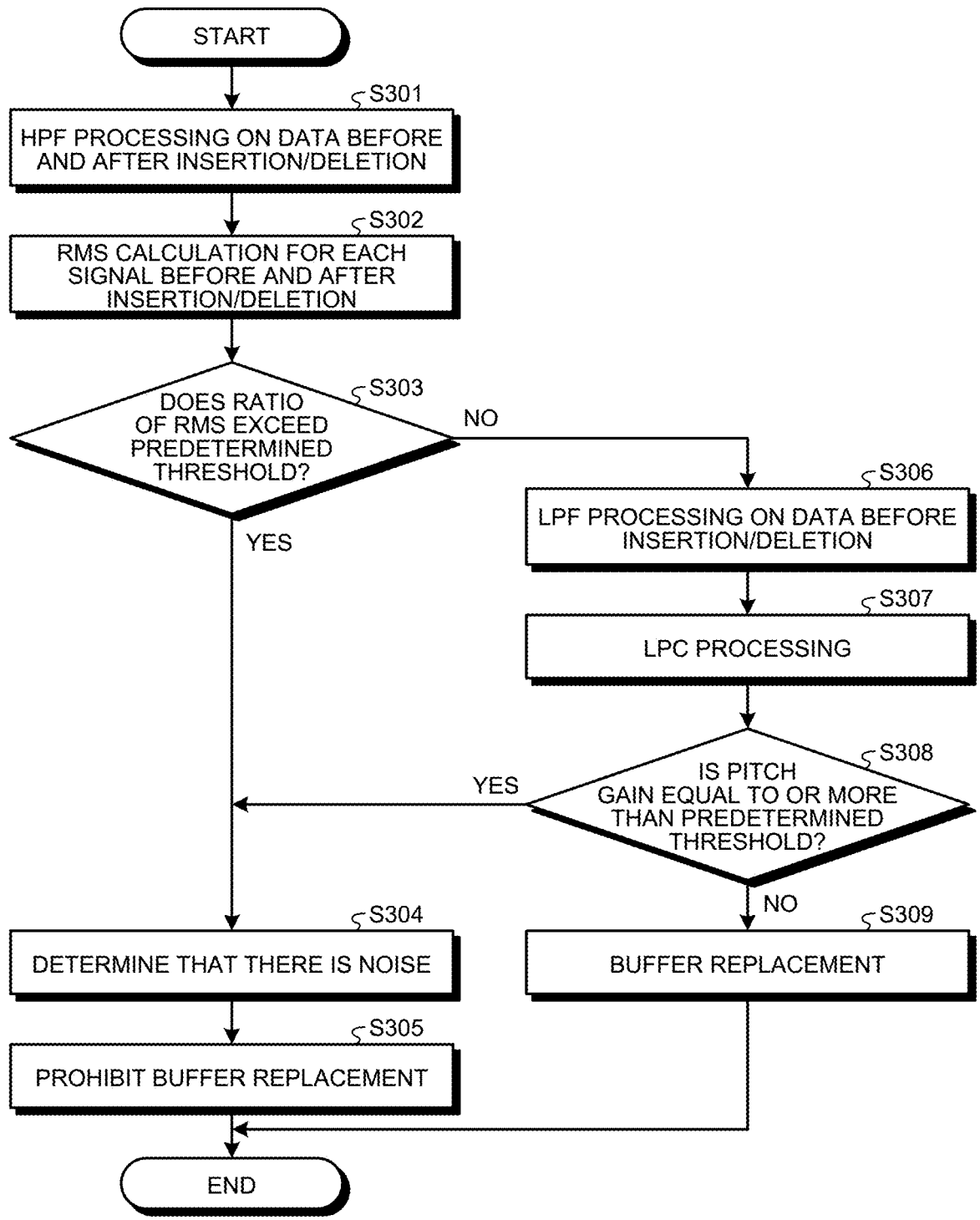
FIG. 11 is a flowchart illustrating a procedure of noise check processing executed by a data processing apparatus according to an embodiment.

Next, a procedure of processing executed by the data processing apparatus 1 according to an embodiment will be described with reference to FIGS. 9 to 11. FIG. 9 is a flowchart illustrating a procedure of entire processing executed by the data processing apparatus 1 according to an embodiment. FIG. 10 is a flowchart illustrating a procedure of low-frequency signal detection processing executed by the data processing apparatus 1 according to an embodiment. FIG. 11 is a flowchart illustrating a procedure of noise check processing executed by the data processing apparatus 1 according to an embodiment.

First, a procedure of entire processing executed by the data processing apparatus 1 according to an embodiment will be described with reference to FIG. 9.

As illustrated in FIG. 9, the insertion/deletion unit 33 first reads the LPCM data stored in the LPCM buffer 42, and performs low-frequency signal detection processing (Step S101).

Subsequently, the insertion/deletion unit 33 performs tone signal detection processing on the frame detected by the low-frequency signal detection processing as the target to be inserted or deleted (step S102).

Subsequently, the insertion/deletion unit 33 determines whether or not a target to be inserted or deleted has been detected from the frame by the tone signal detection processing, that is, whether or not the frame can be inserted and deleted (Step S103).

Subsequently, in a case where the insertion/deletion unit 33 determines that the frame is able to be inserted and deleted (Step S103: Yes), the insertion/deletion unit 33 performs insertion/deletion processing on a target to be inserted or deleted in the frame (Step S104).

Subsequently, the insertion/deletion unit 33 performs noise check processing by comparing the frame before the insertion/deletion processing and the frame after the insertion/deletion processing (Step S105).

Subsequently, in a case where it is detected that no noise is generated by the noise check processing, the insertion/deletion unit 33 performs buffer replacement processing of replacing the frame that is the LPCM data stored in the LPCM buffer 42 with the frame after the insertion/deletion processing (Step S106), and ends the processing.

Meanwhile, in Step S103, in a case where the insertion/deletion unit 33 determines that the frame is not able to be inserted and deleted (Step S103: No), the insertion/deletion unit 33 performs attack signal detection processing to such frame (Step S107).

Subsequently, the insertion/deletion unit 33 determines whether or not an attack signal that is a target to be inserted or deleted has been detected by the attack signal detection processing, that is, whether or not the frame can be inserted and deleted (Step S108).

In a case where the insertion/deletion unit 33 determines that the frame is able to be inserted and deleted (Step S108: Yes), the insertion/deletion unit 33 performs processing of Step S104.

Meanwhile, in a case where the insertion/deletion unit 33 determines that the frame is not able to be inserted and deleted (Step S108: No), the insertion/deletion unit 33 performs noise signal detection processing to such frame (Step S109).

Subsequently, the insertion/deletion unit 33 determines whether or not a noise signal that is a target to be inserted or deleted has been detected by the noise signal detection processing, that is, whether or not the frame can be inserted and deleted (Step S110).

In a case where the insertion/deletion unit 33 determines that the frame is able to be inserted and deleted (Step S110: Yes), the insertion/deletion unit 33 performs processing of Step S104.

Meanwhile, in a case where the insertion/deletion unit 33 determines that the frame is not able to be inserted and deleted (Step S110: No), the insertion/deletion unit 33 performs recovery processing to such frame (Step S111), and ends the processing.

Next, a procedure of low-frequency signal detection processing executed by the data processing apparatus 1 according to an embodiment will be described with reference to FIG. 10.

In the low-frequency signal detection processing, the insertion/deletion unit 33 first performs sorting processing on samples included in a frame in ascending order or descending order by absolute values of signal levels (Step S201).

Subsequently, the insertion/deletion unit 33 extracts a sample whose signal level is less than a predetermined value on the basis of the sorting processing, performs selection processing of selecting three samples including the sample extracted and samples located before and after the sample, and further performs exclusion processing of excluding the three samples when the signs of the signal levels of the three selected samples are inverted (Step S202).

Subsequently, the insertion/deletion unit 33 calculates approximate lines on the basis of the selected three samples (Step S203).

Subsequently, the insertion/deletion unit 33 determines whether the calculated inclination of the approximate line is less than a predetermined threshold (Step S204).

Subsequently, in a case where the inclination of the approximate line based on the three samples is less than the predetermined threshold (Step S204: Yes), the insertion/deletion unit 33 sets the three samples as targets of the insertion/deletion processing (targets to be inserted or deleted) (Step S205), and ends the processing.

Subsequently, in a case where the inclination of the approximate line based on the three samples is equal to or more than the predetermined threshold (Step S204: No), the insertion/deletion unit 33 sets the three samples as non-targets of the insertion/deletion processing (targets not to be inserted or deleted) (Step S206), and ends the processing.

Next, a procedure of noise check processing executed by the data processing apparatus 1 according to an embodiment will be described with reference to FIG. 11.

In the noise check processing, first, the insertion/deletion unit 33 performs HPF processing on a frame that is data before and after the insertion/deletion processing (Step S301).

Subsequently, the insertion/deletion unit 33 performs processing of calculating an RMS value on the basis of the high-frequency signal extracted by the HPF processing performed on the frames before and after the insertion/deletion processing (Step S302).

Subsequently, the insertion/deletion unit 33 determines whether or not the ratio of the RMS value based on the frame after the insertion/deletion processing to the RMS value based on the frame before the insertion/deletion processing exceeds a predetermined threshold (Step S303).

If the ratio of the RMS values exceeds the predetermined threshold (step S303: Yes), the insertion/deletion unit 33 determines that there is noise (high-frequency noise) (Step S304).

Subsequently, in a case where the insertion/deletion unit 33 determines that there is noise, the insertion/deletion unit 33 maintains the frame stored in the LPCM buffer 42, that is, prohibits replacement with the frame after the insertion/deletion processing (Step S305), and ends the processing.

On the other hand, in Step S303, in a case where the ratio of the RMS values is equal to or less than the predetermined threshold value (Step S303: No), the insertion/deletion unit 33 performs the LPF processing on the frame that is the data before the insertion/deletion processing (Step S306).

Subsequently, the insertion/deletion unit 33 performs LPC processing on the low-frequency signal extracted by the LPF processing (Step S307).

Subsequently, the insertion/deletion unit 33 determines whether or not the pitch gain is equal to or more than a predetermined threshold on the basis of the signal after the LPC processing (Step S308).

In a case where the pitch gain is equal to or more than a predetermined threshold (Step S308: Yes), the insertion/deletion unit 33 performs the processing of Step S304. On the contrary, in a case the pitch gain is less than a predetermined threshold (Step S308: No), the insertion/deletion unit 33 replace the frame stored in the LPCM buffer 42 with the frame after the insertion/deletion processing (Step S309), and ends the processing.

<<5. Modification>>

In the data processing system S described above, the configuration including one data processing apparatus 1 and one data transmission apparatus 100 has been described. However, a plurality of data processing apparatuses 1 may be provided. In such a case, one data processing apparatus 1 performs the insertion/deletion processing to synchronize with the other data processing apparatus 1. This point will be described with reference to FIGS. 12A to 13B.

Figure 12A:
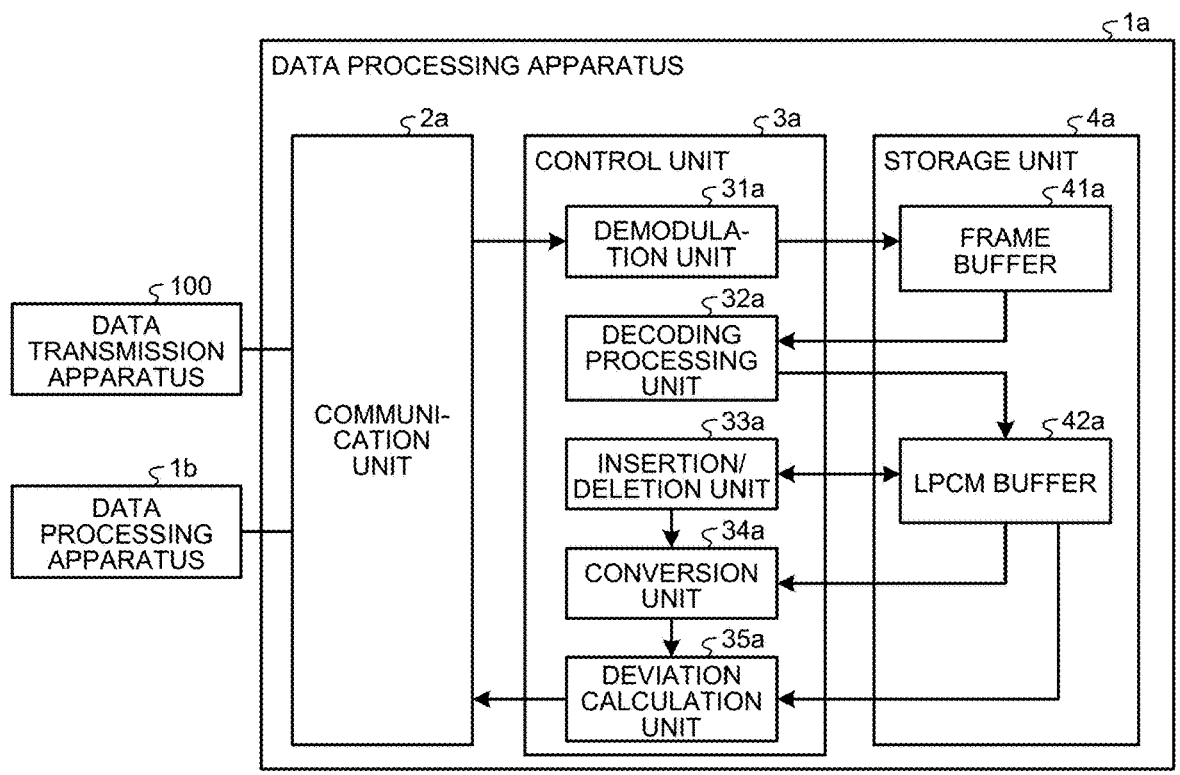
FIG. 12A is a block diagram illustrating a configuration of a data processing apparatus according to a modification.
Figure 12B:
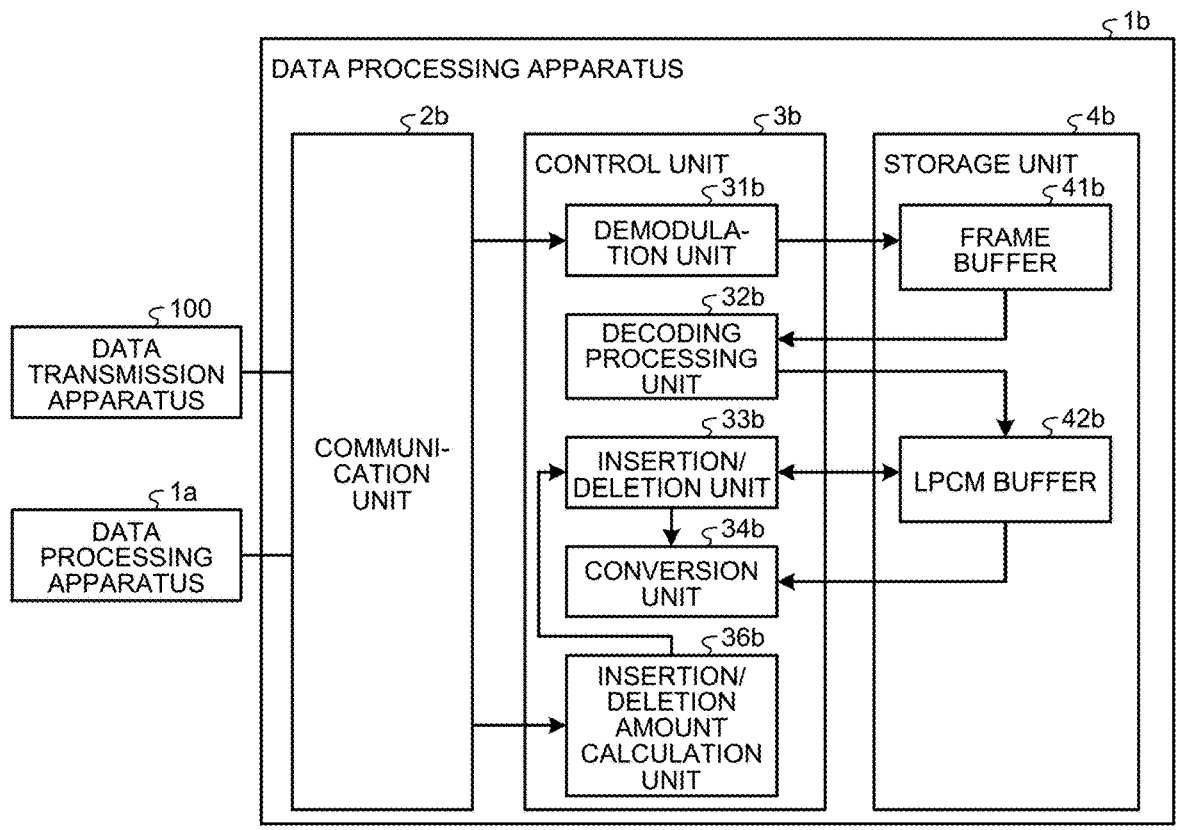
FIG. 12B is a block diagram illustrating a configuration of a data processing apparatus according to a modification.

FIGS. 12A and 12B are block diagrams illustrating a configuration of a data processing apparatuses 1a and 1b according to a modification. The two data processing apparatuses 1a and 1b illustrated in FIGS. 12A and 12B are communicably connected to each other and are communicably connected to the data transmission apparatus 100. In addition, the two data processing apparatuses 1a and 1b are, for example, wireless earphones, and specifically, are completely independent earphones that are not connected in a wired manner, such as cords on the left and right.

Hereinafter, the data processing apparatus 1a illustrated in FIG. 12A is referred to as a first data processing apparatus 1a, and the data processing apparatus 1b illustrated in FIG. 12B is referred to as a second data processing apparatus 1b.

As illustrated in FIG. 12A, the first data processing apparatus 1a according to the modification further includes a deviation calculation unit 35a. Furthermore, as illustrated in FIG. 12B, the second data processing apparatus 1b according to the modification further includes an insertion/deletion amount calculation unit 36b. Note that the first data processing apparatus 1a may further include the insertion/deletion amount calculation unit 36b, and may include the insertion/deletion amount calculation unit 36b instead of the deviation calculation unit 35a. In addition, the second data processing apparatus 1b may further include the deviation calculation unit 35a, and may include the deviation calculation unit 35a instead of the insertion/deletion amount calculation unit 36b.

The deviation calculation unit 35a calculates a deviation amount of frequency clocks between the data transmission apparatus 100 and the first data processing apparatus 1a. For example, the deviation calculation unit 35a calculates, as the deviation amount, a difference between the data amount (the number of samples) received from data transmission apparatus 100 and the data amount (the number of samples) output from first data processing apparatus 1a. Alternatively, the deviation calculation unit 35a can calculate the data consumption amount of the LPCM buffer 42a as the deviation amount. The data consumption amount is a difference between the number of samples input from the decoding processing unit 32a to the LPCM buffer 42 and the number of samples read from the LPCM buffer 42a by the conversion unit 34a.

The deviation calculation unit 35a outputs deviation information indicating the calculated deviation amount to the second data processing apparatus 1b via the communication unit 2a.

The insertion/deletion amount calculation unit 36b in the second data processing apparatus 1b calculates the insertion/deletion amount of the insertion/deletion processing in the insertion/deletion unit 33b on the basis of the deviation information received from the first data processing apparatus 1a. For example, the insertion/deletion amount calculation unit 36b calculates the deviation amount in the deviation information as the insertion/deletion amount. The deviation amount is expressed by the number of samples.

The insertion/deletion amount calculation unit 36b notifies the insertion/deletion unit 33b of information on the calculated insertion/deletion amount. Then, the insertion/deletion unit 33b performs the insertion/deletion processing on the basis of the insertion/deletion amount acquired from the insertion/deletion amount calculation unit 36b. Here, a specific example of processing of the data processing system S according to a modification will be described with reference to FIGS. 13A and 13B.

Figure 13A:
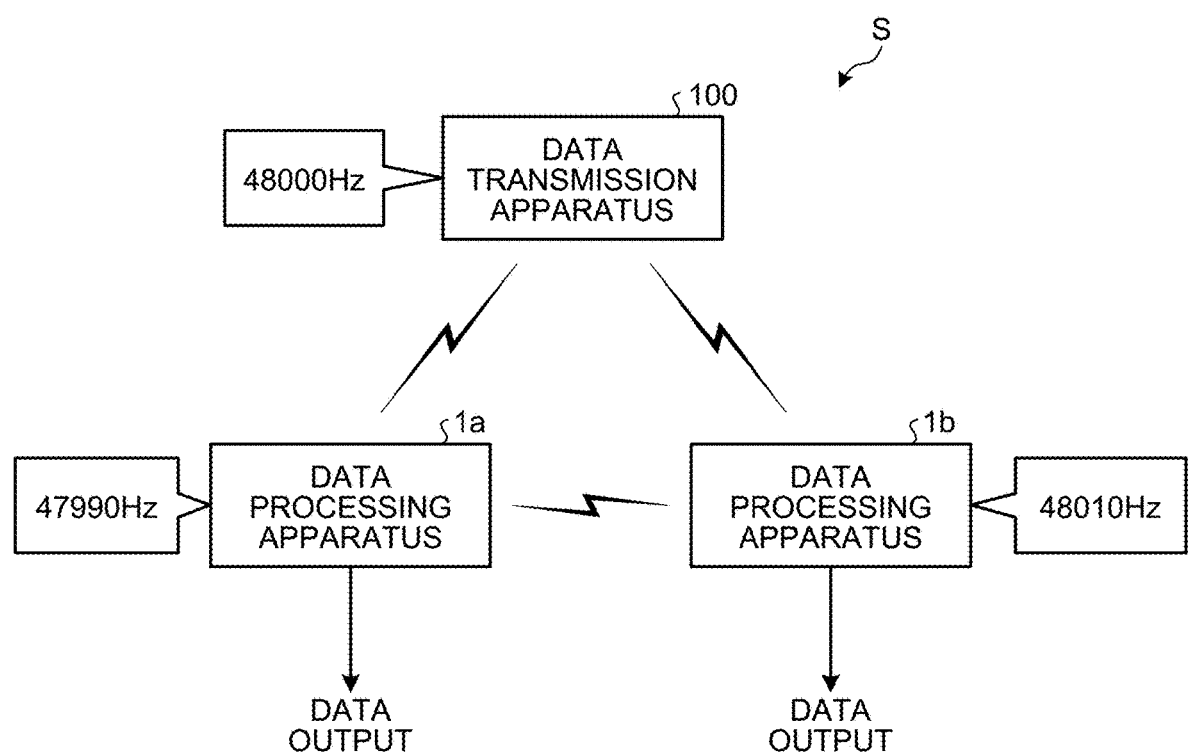
FIG. 13A is a diagram illustrating a specific example of processing executed by a data processing system according to a modification.
Figure 13B:
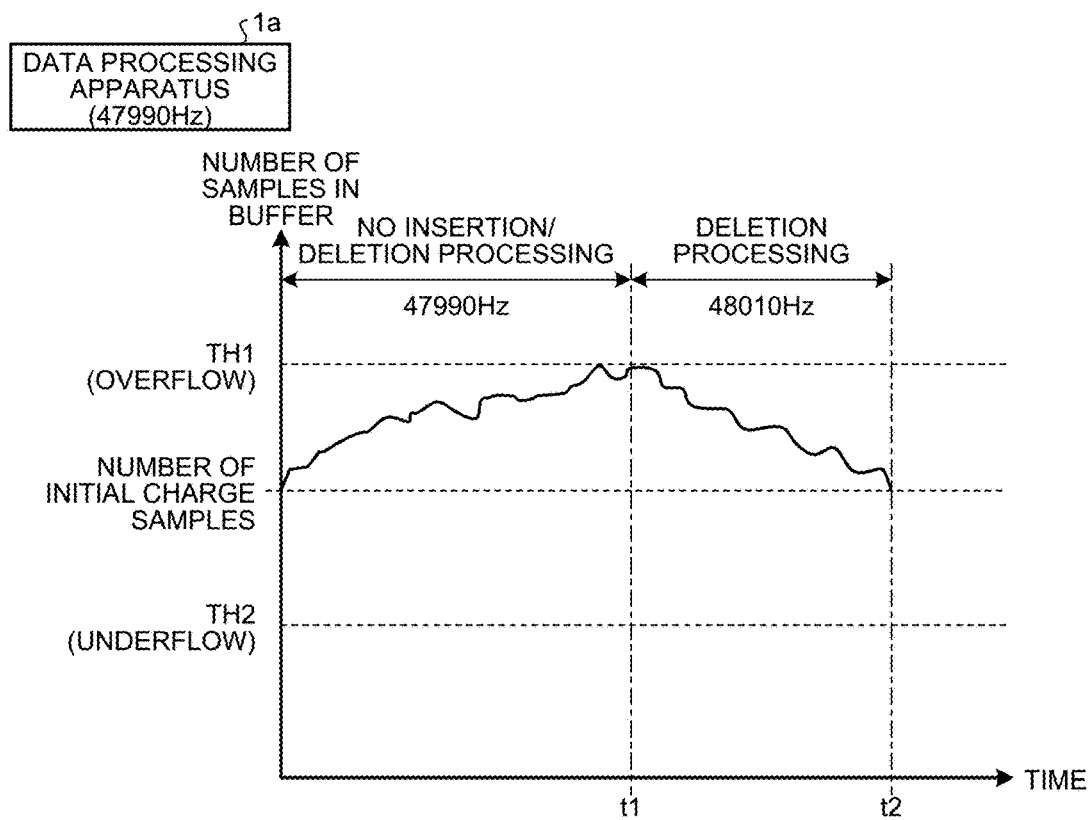
FIG. 13B is a diagram illustrating a specific example of processing executed by a data processing system according to a modification.
Figure 13B:
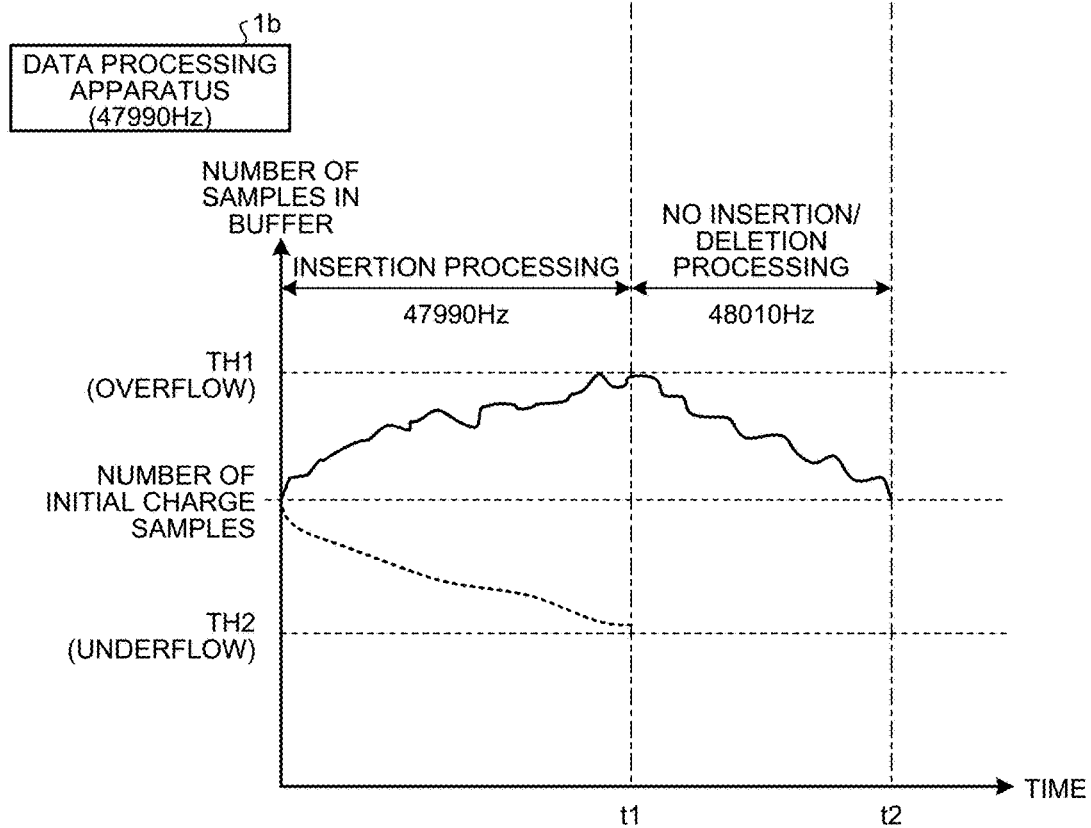

FIGS. 13A and 13B are diagrams illustrating a specific example of processing executed by the data processing system S according to a modification. As illustrated in FIG. 13A, it is assumed that the clock frequencies are 48000 Hz in the data transmission apparatus 100, 47990 Hz in the first data processing apparatus 1a, and 48010 Hz in the second data processing apparatus 1b. In addition, FIG. 13B graphically illustrates the transition of the accumulation amount of data the LPCM buffers 42a and 42b over time in the first data processing apparatus 1a and the second data processing apparatus 1b.

As illustrated in the lower part of FIG. 13B, if the second data processing apparatus 1b is not synchronized with the first data processing apparatus 1a and the insertion/deletion processing is not performed, the accumulation amount of data of the LPCM buffer 42b in the second data processing apparatus 1b gradually decreases with respect to the number of initial charge samples (broken line illustrated in FIG. 13B). On the other hand, the first data processing apparatus 1a gradually increases with respect to the number of initial charge samples. That is, since the first data processing apparatus 1a and the second data processing apparatus 1b are not synchronized with each other, the reproduction sounds do not coincide with each other. Then, in such a case, movements of the sound image due to the Haas effect occurs, and the viewer feels wrongness.

Therefore, in the data processing system S according to the modification, the second data processing apparatus 1b acquires the clock frequency deviation amount from the first data processing apparatus 1a, thereby performing the insertion/deletion processing for synchronizing with the first data processing apparatus 1a.

Specifically, first, since the data transmission apparatus 100 is 48000 Hz while the first data processing apparatus 1a is 47990 Hz, the deviation calculation unit 35a of the first data processing apparatus 1a calculates −208 ppm corresponding to −10 Hz that is the difference in clock frequency as the deviation amount. That is, the first data processing apparatus 1a is delayed by the number of samples corresponding to 208 ppm from the data transmission apparatus 100.

Then, the second data processing apparatus 1b acquires the deviation information of −208 ppm, which is the deviation amount, from the first data processing apparatus 1a and calculates the insertion/deletion amount. Specifically, first, since the second data processing apparatus 1b is 48010 Hz while the data transmission apparatus 100 is 48000 Hz, the insertion/deletion amount calculation unit 36b of the second data processing apparatus 1b calculates 208 ppm corresponding to 10 Hz that is the difference in clock frequency as the deviation amount. That is, the second data processing apparatus 1b is advanced by the number of samples corresponding to 208 ppm with respect to the data transmission apparatus 100. In other words, the second data processing apparatus 1b is advanced by the number of samples corresponding to 416 ppm with respect to the first data processing apparatus 1a.

Subsequently, the insertion/deletion amount calculation unit 36b calculates an insertion/deletion amount (the number of samples) for synchronization with the first data processing apparatus 1a on the basis of the deviation amount of the first data processing apparatus 1a and the deviation amount of the second data processing apparatus 1b. That is, since the data consumption amount of the second data processing apparatus 1b is larger than that of the first data processing apparatus 1a by the number of samples corresponding to 416 ppm, the insertion/deletion amount calculation unit 36b calculates the number of samples corresponding to 416 ppm as the insertion amount. Then, the insertion/deletion unit 33b performs insertion/deletion processing of the number of samples, which is the insertion amount. That is, the insertion/deletion unit 33b acquires a difference in clock frequencies between the first data processing apparatus 1a (another data processing apparatus to be synchronized) and the second data processing apparatus 1b (the data processing apparatus) and performs the insertion/deletion processing as many times as the samples in number corresponding to the difference.

As a result, as illustrated in the lower part of FIG. 13B, the insertion/deletion unit 33b in the second data processing apparatus 1b can be synchronized with the first data processing apparatus 1a by performing the insertion processing for the number of samples corresponding to 416 ppm. That is, in FIG. 13B, the accumulation amounts of data of the LPCM buffers 42a and 42b are synchronized.

Then, at time t1, the first data processing apparatus 1a is saturated when the LPCM buffer 42a becomes equal to or more than the threshold value TH1, and thus, the deletion processing is performed after time t1. In FIG. 13B, the insertion/deletion unit 33a of the first data processing apparatus 1a deletes the number of samples corresponding to 20 Hz. As a result, with respect to the data amount of 48000 Hz received from the data transmission apparatus 100, the data amount (the number of samples) corresponding to 48010 Hz is consumed together with the deletion amount of 20 Hz and 47990 Hz that is the data consumption amount of the first data processing apparatus 1a. As a result, after time t1, the accumulation amount of data of the LPCM buffer 42a in the first data processing apparatus 1a gradually decreases.

Furthermore, at time t1, since the second data processing apparatus 1b is synchronized with the first data processing apparatus 1a, the LPCM buffer 42a becomes equal to or more than the threshold value TH1, and the LPCM buffer 42a is saturated. Then, the second data processing apparatus 1b follows the first data processing apparatus 1a and performs synchronization such that a data amount (the number of samples) corresponding to 48010 Hz is consumed. That is, after time t1, since the second data processing apparatus 1b follows the first data processing apparatus 1a, the second data processing apparatus 1b does not perform the insertion/deletion processing.

As described above, the second data processing apparatus 1b can be synchronized with the first data processing apparatus 1a and the data transmission apparatus 100 with high accuracy by acquiring the deviation information from the first data processing apparatus 1a and calculating the insertion/deletion amount.

<<6. Hardware Configuration Example>>

Figure 14:
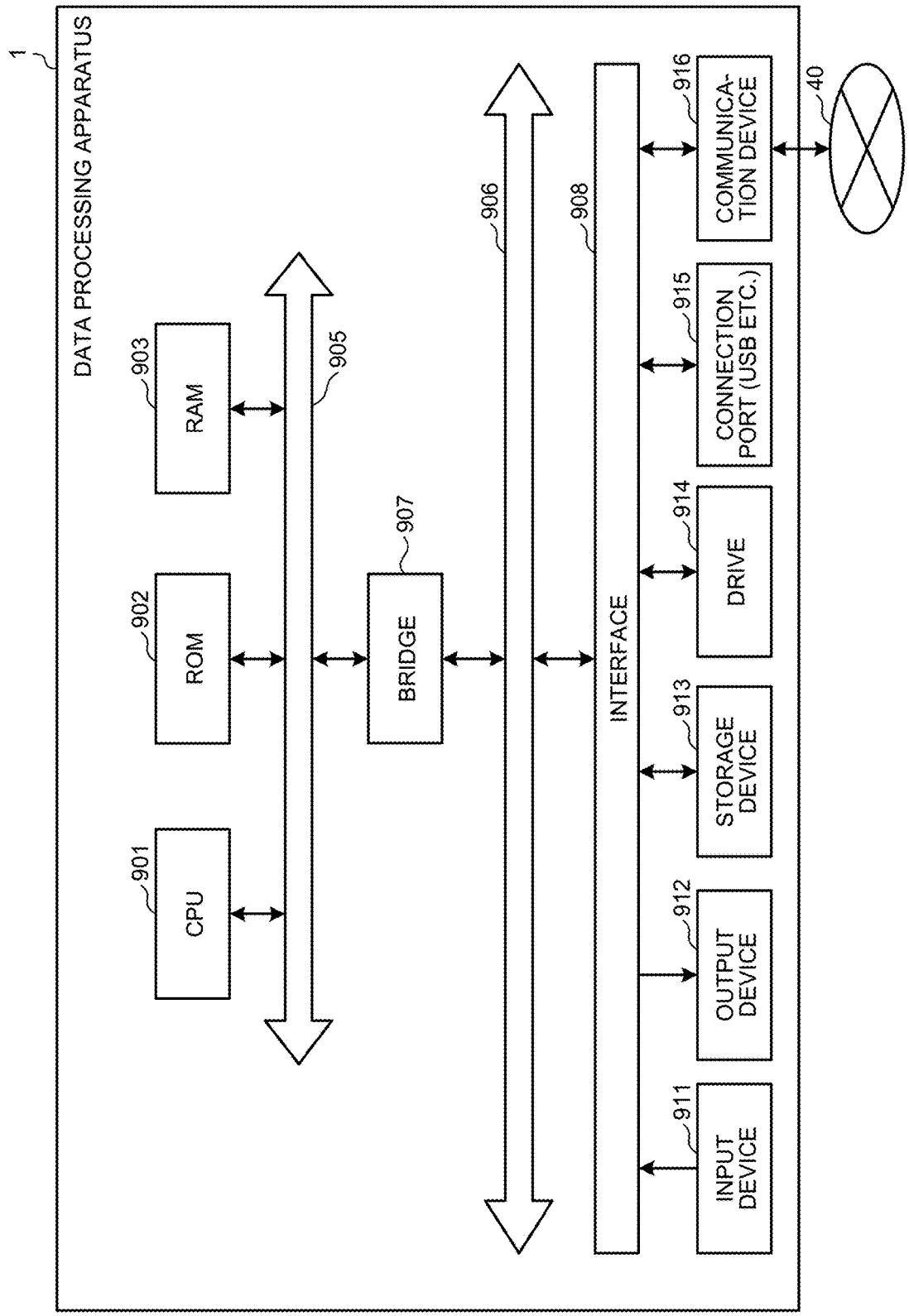
FIG. 14 is a block diagram illustrating an example of a hardware configuration of the data processing apparatus according to the present embodiment.

Subsequently, an example of a hardware configuration of the data processing apparatus 1 or the like according to the present embodiment will be described with reference to FIG. 14. FIG. 14 is a block diagram illustrating an example of a hardware configuration of the data processing apparatus 1 according to the present embodiment.

As illustrated in FIG. 14, the data processing apparatus 1 includes a central processing unit (CPU) 901, read only memory (ROM) 902, random access memory (RAM) 903, a host bus 905, a bridge 907, an external bus 906, an interface 908, an input device 911, an output device 912, a storage device 913, a drive 914, a connection port 915, and a communication device 916. The information processing apparatus 20 may include a processing circuit such as an electric circuit, a DSP, or an ASIC instead of or in addition to the CPU 901.

The CPU 901 functions as an arithmetic processing device and a control device, and controls an overall operation in the data processing apparatus 1 according to various programs. Furthermore, the CPU 901 may be a microprocessor. The ROM 902 stores programs, operation parameters, and the like used by the CPU 901. The RAM 903 temporarily stores programs used in execution of the CPU 901, parameters that appropriately change in the execution, and the like. The CPU 901 may execute, for example, a function as the demodulation unit 31, the decoding processing unit 32, the insertion/deletion unit 33, and the conversion unit 34.

The CPU 901, the ROM 902, and the RAM 903 are mutually connected by the host bus 905 including a CPU bus and the like. The host bus 905 is connected to the external bus 906 such as a peripheral component interconnect/interface (PCI) bus via the bridge 907. Note that the host bus 905, the bridge 907, and the external bus 906 do not necessarily need to be separately configured, and these functions may be implemented on one bus.

The input device 911 is a device to which information is input by the user, such as a mouse, a keyboard, a touch panel, a button, a microphone, a switch, and a lever. Alternatively, the input device 911 may be, for example, a remote control device using infrared rays or other radio waves, or may be an external connection device such as a mobile phone or a PDA corresponding to the operation of the data processing apparatus 1. Moreover, the input device 911 may include, for example, an input control circuit or the like that generates an input signal on the basis of the information input by the user using the above-described input means.

The output device 912 is a device capable of visually or aurally notifying the user of information. The output device 912 includes display devices such as a cathode ray tube (CRT) display device, a liquid crystal display device, a plasma display device, an electro luminescence (EL) display device, a laser projector, a light emitting diode (LED) projector, and a lamp, audio output devices such as a speaker and a headphone, a printer device, and the like.

The output device 912 outputs, for example, results obtained by various types of processing performed by the data processing apparatus 1. Specifically, the output device 912 visually displays the results obtained by the various types of processing performed by the data processing apparatus 1 in various formats such as texts, images, tables, and graphs. Alternatively, the output device 912 may convert an audio signal including reproduced audio data, acoustic data, and the like into an analog signal and aurally output the analog signal. The input device 911 and the output device 912 may execute a function of an interface, for example.

The storage device 913 is a device for data storage formed as an example of the storage unit 4 of the data processing apparatus 1. The storage device 913 may be realized by, for example, a magnetic storage unit device such as a hard disk drive (HDD), a semiconductor storage device, an optical storage device, a magneto-optical storage device, or the like. The storage device 913 may include, for example, a storage medium, a recording device that records data in the storage medium, a reading device that reads data from the storage medium, a deletion device that deletes data recorded in the storage medium, and the like. The storage device 913 stores programs executed by the CPU 901, various data, various data acquired from the outside, and the like. The storage device 913 may execute a function as the frame buffer 41 or the LPCM buffer 42, for example.

The drive 914 is a reader/writer for a storage medium, and is built in or externally attached to the data processing apparatus 1. The drive 914 reads out information recorded in a removable storage medium such as mounted magnetic disk, optical disk, magneto-optical disk, or semiconductor memory, and outputs the information to the RAM 903. Furthermore, the drive 914 can also write information to the removable storage medium.

The connection port 915 is an interface connected to an external device. The connection port 915 is a connection port to an external device capable of transmitting data by a universal serial bus (USB) and the like, for example.

The communication device 916 is, for example, an interface including a communication device and the like for being connected to a network 920. The communication device 916 may be, for example, a communication card for wired or wireless local area network (LAN), long term evolution (LTE), Bluetooth (registered trademark), wireless USB (WUSB), or the like. Furthermore, the communication device 916 may also be a router for optical communication, a router for asymmetric digital subscriber line (ADSL), a modem for various communications, or the like. The communication device 916 can transmit and receive signals and the like according to a predetermined protocol such as TCP/IP and the like, for example, with the Internet or other communication devices.

Note that the network 40 is a wired or wireless transmission path of information. For example, the network 40 may include the Internet, a public network such as a telephone network, a satellite communication network, or the like, various local area networks (LANs) including Ethernet (registered trademark), a wide area network (WAN), or the like. Furthermore, the network 920 may include a leased line network such as an internet protocol-virtual private network (IP-VPN).

Note that it is also possible to create a computer program for causing hardware such as a CPU, ROM, and RAM built in the data processing apparatus 1 to exhibit functions equivalent to the respective configurations of the data processing apparatus 1 according to the present embodiment described above. Furthermore, a storage medium storing the computer program can also be provided.

Among the processing described in the embodiments, all or a part of the processing, described as automatic processing, can be performed manually, or all or a part of the processing, described as manual processing, can be performed automatically by a known method. In addition, the processing procedures, specific names, and information including various data and parameters indicated in the document and the drawings can be arbitrarily changed unless otherwise specified. For example, various types of information illustrated in the drawings are not limited to the illustrated information.

Furthermore, the constituent elements of the individual devices illustrated in the drawings are functionally conceptual and are not necessarily configured physically as illustrated in the drawings. To be specific, the specific form of distribution and integration of the devices is not limited to the one illustrated in the drawings, and all or a part thereof can be configured by functionally or physically distributing and integrating in arbitrary units according to various loads, usage conditions, and the like.

Furthermore, the embodiments described above can be appropriately combined to the extent that the processing contents do not contradict each other. Furthermore, the order of each step illustrated in the flowcharts and the sequence diagrams of the above-described embodiment can be changed as appropriate.

<<7. Summary>>

As described above, the data processing apparatus 1 includes the signal processing unit (the demodulation unit 31 and the decoding processing unit 32) and the insertion/deletion unit 33. The signal processing unit performs predetermined signal processing (demodulation processing and decoding processing) on the wirelessly received data for each frame that includes a predetermined number of samples, and stores the data in the buffer (frame buffer 41 and the LPCM buffer 42). In the case where an amount of the data accumulated in the buffer is out of a predetermined range, the insertion/deletion unit 33 performs insertion/deletion processing that inserts or deletes the data in units of samples.

As a result, as compared with a case where the insertion/deletion processing is performed in units of frames in the related art, by performing the insertion/deletion processing in units of samples, it is possible to follow the fluctuation of the buffer in units of samples, and thus, it is possible to suppress data output interruption with high accuracy.

In addition, the insertion/deletion unit 33 causes a consecutive predetermined number of the samples to be a target to be inserted or deleted in the frame in a case where a slope of an approximate line AL calculated on the basis of the consecutive predetermined number of samples is less than a predetermined threshold value.

As a result, since the insertion/deletion processing can be performed on the sample having a small change in the signal level, it is possible to suppress the feeling of wrongness given to the person by the insertion/deletion processing. Therefore, for example, in the case of acoustic data, it is possible to make it difficult for a person to perceive abnormal noise.

In addition, the insertion/deletion unit 33 sets a consecutive predetermined number of samples whose signal levels are less than a predetermined value as targets to be inserted or deleted.

As a result, since the insertion/deletion processing can be performed on the sample having a relatively small output, it is possible to suppress the feeling of wrongness given to the person by the insertion/deletion processing. Therefore, for example, in the case of acoustic data, since the volume is relatively low, it is possible to make it difficult for a person to perceive abnormal noise.

Furthermore, the insertion/deletion unit 33 excludes the consecutive predetermined number of samples from the target to be inserted or deleted in a case where a sign of the consecutive predetermined number of samples is inverted.

As a result, it is possible to suppress the insertion/deletion processing from being performed on a sample that should not be originally a target to be inserted or deleted.

Furthermore, the insertion/deletion unit 33 excludes a frame whose sample has a tone waveform corresponding to a tone signal from a target to be inserted or deleted.

As a result, it is possible to suppress the insertion/deletion processing from being performed on a special signal such as a tone signal.

Furthermore, in a case where the frame includes the attack waveform having a change in signal levels of the sample equal to or larger than a predetermined value, the insertion/deletion unit 33 causes a sample corresponding to an attack waveform to be a target to be inserted or deleted.

As a result, since the insertion/deletion processing is performed on the attack signal which is the masker, it is possible to suppress feeling of wrongness to the data output by the insertion/deletion processing by being masked by the attack signal.

In addition, in a case where a temporal discontinuous noise waveform is included in a waveform of a sample in the frame, the insertion/deletion unit 33 causes the sample corresponding to the noise waveform to be a target to be inserted or deleted.

As a result, since the insertion/deletion processing is performed on the noise signal, it is possible to suppress feeling of wrongness to the data output by the insertion/deletion processing by being masked by the noise signal.

Furthermore, the insertion/deletion unit 33 increases or decreases the samples in number to be output in the frame on the basis of the samples in number necessary to be subjected to the insertion/deletion processing in a case where the frames without a target to be inserted or deleted are consecutive frames for a predetermined number or more.

As a result, in a case where the a target to be inserted or deleted is not found regardless of necessity of the insertion/deletion processing, saturation and shortage of the buffer can be suppressed by adjusting the sampling rate.

In addition, the insertion/deletion unit 33 causes data before the insertion/deletion processing to be a target to be output in a case where noise is determined to occur in data after the insertion/deletion processing on the basis of a result obtained by comparing pieces of the data before and after the insertion/deletion processing upon the insertion/deletion processing.

As a result, it is possible to determine whether or not noise perceived by a person is newly generated by the insertion/deletion processing, and thus, it is possible to output only data of the insertion/deletion processing that is difficult for a person to perceive.

Furthermore, the insertion/deletion unit 33 acquires a difference in clock frequencies between the data processing apparatus and another data processing apparatus to be synchronized and performs the insertion/deletion processing as many times as the samples in number corresponding to the difference.

As a result, a clock frequency deviation from another device (another data processing apparatus 1) can be compensated by the insertion/deletion processing, and thus synchronization with the other device can be performed with high accuracy.

Although the embodiments of the present disclosure have been described above, the technical scope of the present disclosure is not limited to the embodiments described above as it is, and various modifications can be made without departing from the gist of the present disclosure. In addition, constituent elements of different embodiments and modification examples may be appropriately combined.

Furthermore, the effects of the embodiments described in the present specification are merely examples and are not limited, and other effects may be provided.

Note that the present technology can also have the following configurations.

(1)

A data processing apparatus comprising:

a signal processing unit configured to perform predetermined signal processing for each frame having a predetermined number of samples on data received wirelessly and store signal-processed data in a buffer; and an insertion/deletion unit configured to perform insertion/deletion processing that inserts or deletes the data for each sample in a case where an amount of the data accumulated in the buffer is out of a predetermined range.

(2)

The data processing apparatus according to (1), wherein the insertion/deletion unit causes a consecutive predetermined number of the samples to be a target to be inserted or deleted in the frame in a case where a slope of an approximate line calculated on a basis of the consecutive predetermined number of samples is less than a predetermined threshold value.

(3)

The data processing apparatus according to (2), wherein the insertion/deletion unit causes the consecutive predetermined number of samples with a signal level less than a predetermined value to be the target to be inserted or deleted.

(4)

The data processing apparatus according to the above-described (2) to (3), wherein the insertion/deletion unit excludes the consecutive predetermined number of samples from the target to be inserted or deleted in a case where a sign of the consecutive predetermined number of samples is inverted.

(5)

The data processing apparatus according to the above-described (1) to (4), wherein the insertion/deletion unit excludes a frame whose sample has a tone waveform corresponding to a tone signal from a target to be inserted or deleted.

(6)

The data processing apparatus according to the above-described (1) to (5),
wherein the insertion/deletion unit
causes a sample corresponding to an attack waveform included in the frame to be a target to be inserted or deleted, the attack waveform having a change in signal levels of the sample equal to or larger than a predetermined value.

(7)

The data processing apparatus according to the above-described (1) to (6),
wherein the insertion/deletion unit
causes a sample corresponding to a temporal discontinuous noise waveform included in a waveform of the sample in the frame to be a target to be inserted or deleted.

(8)

The data processing apparatus according to the above-described (1) to (7),
wherein the insertion/deletion unit
increases or decreases the samples in number to be output in the frame on a basis of the samples in number necessary to be subjected to the insertion/deletion processing in a case where the frames without a target to be inserted or deleted are consecutive frames for a predetermined number or more.

(9)

The data processing apparatus according to the above-described (1) to (8),
wherein the insertion/deletion unit
causes data before the insertion/deletion processing to be a target to be output in a case where noise is determined to occur in data after the insertion/deletion processing on a basis of a result obtained by comparing pieces of the data before and after the insertion/deletion processing upon the insertion/deletion processing.

(10)

The data processing apparatus according to the above-described (1) to (9),
wherein the insertion/deletion unit
acquires a difference in clock frequencies between the data processing apparatus and another data processing apparatus to be synchronized and performs the insertion/deletion processing as many times as the samples in number corresponding to the difference.

(11)

A data processing method comprising:
performing predetermined signal processing for each frame having a predetermined number of samples on data received wirelessly and storing signal-processed data in a buffer; and
performing insertion/deletion processing that inserts or deletes the data for each sample in a case where an amount of the data accumulated in the buffer is out of a predetermined range.

(12)

A data processing program readable by a computer,
causing the computer to function as:
a signal processing unit configured to perform predetermined signal processing for each frame having a predetermined number of samples on data received wirelessly and store signal-processed data in a buffer; and
an insertion/deletion unit configured to perform insertion/deletion processing that inserts or deletes the data for each sample in a case where an amount of the data accumulated in the buffer is out of a predetermined range.

REFERENCE SIGNS LIST

1 DATA PROCESSING APPARATUS
2, 200 COMMUNICATION UNIT
3, 300 CONTROL UNIT
4, 400 STORAGE UNIT
31, 31a, 31b DEMODULATION UNIT
32, 32a, 32b DECODING PROCESSING UNIT
33, 33a, 33b INSERTION/DELETION UNIT
34, 34a, 34b CONVERSION UNIT
35a DEVIATION CALCULATION UNIT
36b INSERTION/DELETION AMOUNT CALCULATION UNIT
41 FRAME BUFFER
42 LPCM BUFFER
100 DATA TRANSMISSION APPARATUS
S DATA PROCESSING SYSTEM

The invention claimed is:

1. A data processing apparatus comprising:
a signal processing unit configured to perform predetermined signal processing for each frame having a predetermined number of samples on data received wirelessly and store signal-processed data in a buffer;
an insertion/deletion unit configured to perform insertion/deletion processing that inserts or deletes the data for each sample in a case where an amount of the data accumulated in the buffer is out of a predetermined range; and
the insertion/deletion unit configured to cause a consecutive predetermined number of the samples to be a target to be inserted or deleted in the frame in a case where a slope of an approximate line calculated on a basis of the consecutive predetermined number of samples is less than a predetermined threshold value.

2. The data processing apparatus according to claim 1,
wherein the insertion/deletion unit causes the consecutive predetermined number of samples with a signal level less than a predetermined value to be the target to be inserted or deleted.

3. The data processing apparatus according to claim 1,
wherein the insertion/deletion unit excludes the consecutive predetermined number of samples from the target to be inserted or deleted in a case where a sign of the consecutive predetermined number of samples is inverted.

4. The data processing apparatus according to claim 1,
wherein the insertion/deletion unit
excludes a frame whose sample has a tone waveform corresponding to a tone signal from a target to be inserted or deleted.

5. The data processing apparatus according to claim 1,
wherein the insertion/deletion unit
causes a sample corresponding to an attack waveform included in the frame to be a target to be inserted or deleted, the attack waveform having a change in signal levels of the sample equal to or larger than a predetermined value.

6. The data processing apparatus according to claim 1,
wherein the insertion/deletion unit
causes a sample corresponding to a temporal discontinuous noise waveform included in a waveform of the sample in the frame to be a target to be inserted or deleted.

7. The data processing apparatus according to claim 1,
wherein the insertion/deletion unit
increases or decreases the samples in number to be output in the frame on a basis of the samples in number necessary to be subjected to the insertion/deletion processing in a case where the frames without a target to be inserted or deleted are consecutive frames for a predetermined number or more.

8. The data processing apparatus according to claim 1, wherein the insertion/deletion unit
causes data before the insertion/deletion processing to be a target to be output in a case where noise is determined to occur in data after the insertion/deletion processing on a basis of a result obtained by comparing pieces of the data before and after the insertion/deletion processing upon the insertion/deletion processing.

9. The data processing apparatus according to claim 1, wherein the insertion/deletion unit
acquires a difference in clock frequencies between the data processing apparatus and another data processing apparatus to be synchronized and performs the insertion/deletion processing as many times as the samples in number corresponding to the difference.

10. A data processing method comprising:
performing predetermined signal processing for each frame having a predetermined number of samples on data received wirelessly and storing signal-processed data in a buffer; and
performing insertion/deletion processing that inserts or deletes the data for each sample in a case where an amount of the data accumulated in the buffer is out of a predetermined range; and
insertion/deletion processing causing a consecutive predetermined number of the samples to be a target to be inserted or deleted in the frame in a case where a slope of an approximate line calculated on a basis of the consecutive predetermined number of samples is less than a predetermined threshold value.

11. A non-transitory computer readable storage medium having data processing instructions readable by a computer stored thereon, that, when executed by the computer:
cause the computer to function as:
a signal processing unit configured to perform predetermined signal processing for each frame having a predetermined number of samples on data received wirelessly and store signal-processed data in a buffer; and
an insertion/deletion unit configured to perform insertion/deletion processing that inserts or deletes the data for each sample in a case where an amount of the data accumulated in the buffer is out of a predetermined range; and
the insertion/deletion unit configured to cause a consecutive predetermined number of the samples to be a target to be inserted or deleted in the frame in a case where a slope of an approximate line calculated on a basis of the consecutive predetermined number of samples is less than a predetermined threshold value.

\* \* \* \* \*